(12) United States Patent
Raymond et al.

(10) Patent No.: US 12,366,497 B2
(45) Date of Patent: Jul. 22, 2025

(54) HYDROCARBON LEAK DETECTION CABLE

(71) Applicant: Raymond & Lae Engineering, Inc., Fort Collins, CO (US)

(72) Inventors: Donald M. Raymond, Fort Collins, CO (US); James Schneider, Fort Collins, CO (US)

(73) Assignee: Raymond & Lae Engineering, Inc., Fort Collins, CO (US)

( * ) Notice: Subject to any disclaimer, the term of this patent is extended or adjusted under 35 U.S.C. 154(b) by 246 days.

(21) Appl. No.: 17/989,525

(22) Filed: Nov. 17, 2022

(65) Prior Publication Data
US 2024/0167905 A1 May 23, 2024

(51) Int. Cl.
G01M 3/04 (2006.01)
G01M 3/16 (2006.01)

(52) U.S. Cl.
CPC ............ G01M 3/045 (2013.01); G01M 3/165 (2013.01)

(58) Field of Classification Search
CPC ... G01M 3/16–188; G01M 3/045; G01M 3/40
See application file for complete search history.

(56) References Cited

U.S. PATENT DOCUMENTS

| | | |
|---|---|---|
| 4,029,889 A | 6/1977 | Mizuochi |
| 4,487,057 A | 12/1984 | Lutz |
| 4,877,923 A | 10/1989 | Sahakian |
| 5,177,996 A | 1/1993 | Sahakian |
| 5,203,202 A | 4/1993 | Spencer |
| 5,341,128 A | 8/1994 | Keyser et al. |
| 10,784,584 B1 | 9/2020 | McNutt |
| 2003/0201781 A1* | 10/2003 | McCoy ............ G01M 3/165 324/525 |
| 2009/0301172 A1 | 12/2009 | Raymond |
| 2010/0218597 A1* | 9/2010 | McCoy ............ G01M 3/045 73/40 |
| 2011/0037483 A1 | 2/2011 | Scheuermann et al. |

(Continued)

FOREIGN PATENT DOCUMENTS

GB 2276766 A * 10/1994 ............. G01D 5/165

OTHER PUBLICATIONS

Zhang et al.; "The Permeability Characteristics of Silicone Rubber"; SAMPE—Society for the Advancement of Material and Process Engineering Fall Technical Conference 2006, "Global Advances in Materials and Process Engineering" proceedings, Coatings and Sealants Section, Nov. 6-9, 2006, Dallas, TX, USA; https://imageserv5.team-logic.com/mediaLibrary/99/D116_20Haibing_20Zhang_20et_20al.pdf; 10 pages.

(Continued)

Primary Examiner — Alexander A Mercado
(74) Attorney, Agent, or Firm — Cochran Freund & Young LLC; William W. Cochran

(57) ABSTRACT

Disclosed is a hydrocarbon leak detection cable that locates hydrocarbon leaks in oil pipelines, gas pipelines, oil and gas tanks, and other devices that store and transport hydrocarbons. Resistive sensor wires are used so that the location of the leak can be detected with a high degree of accuracy in an inexpensive and convenient matter. In addition, hydrocarbon leaks can be detected over long distances, which reduces the cost and provides reliability for detecting hydrocarbon leaks in hydrocarbon pipelines.

3 Claims, 29 Drawing Sheets

(56) References Cited

U.S. PATENT DOCUMENTS

2012/0098555 A1 4/2012 Raymond
2014/0130350 A1 5/2014 Raymond
2016/0238547 A1 8/2016 Park et al.

OTHER PUBLICATIONS

Gugliuzza et al.; "Membranes for hydrocarbon fuel processing and separation"; Advanced Membrane Science and Technology for Sustainable Energy and Environmental Applications, Woodhead Publishing Series in Energy, pp. 295-338; https://doi.org/10.1533/9780857093790.3.295; Aug. 2011; 2 pages.

Nam et al.; "Petrogel: New Hydrocarbon (Oil) Absorbent Based on Polyolefin Polymers"; American Chemical Society, Macromolecules, vol. 49, pp. 5427-5437, University Park, PA, USA; https://pubs.acs.org/doi/10.1021/acs.macromol.6b01244; Jul. 25, 2016; 10 pages.

* cited by examiner

HYDROCARBON LEAK DETECTION CABLE

BACKGROUND

Monitoring of leaks of hydrocarbons such as oil, gas, and other petroleum fluids is important in protecting the environment. Hydrocarbon leaks can occur from both underground and above ground storage tanks, pipelines, petroleum fluid transfer pipes and tubing and machinery that runs on petroleum fluids, such as diesel generators, etc. Leaks can contaminate the ground water table which can cause serious harm to a water supply and create serious health risks. Detection of leaks prior to contaminations by hydrocarbons and petroleum fluids is therefore advantageous and important in the oil and gas industry.

Various methods and devices have been used to detect hydrocarbon leaks. For example, U.S. Utility application Ser. No. 17/235,156, entitled "HYDROCARBON LEAK DETECTION CABLE," filed Apr. 20, 2021, discloses one method of detecting hydrocarbon leaks. This application is specifically incorporated herein by reference in its entirety and is made part of the present U.S. Utility patent application for all that it discloses and teaches.

SUMMARY

An embodiment of the present invention may therefore comprise: a hydrocarbon leak detection cable containing a feedback wire having feedback conductors and insulators surrounding the feedback conductors; sensor wires disposed adjacent to the insulators and separated by the insulators, the sensor wires having a uniform resistance per unit of length; a compressible conductive covering that surrounds the feedback wire and the sensor wires that is placed over the feedback wire and the sensor wire so that a gap is formed between the compressible conductive covering and the sensor wires; a hydrocarbon reactive polymer that expands in the presence of hydrocarbons that surrounds the compressible conductive covering; a non-expandable permeable cover surrounding the hydrocarbon reactive polymer that is permeable to hydrocarbons and directs forces from expansion of the hydrocarbon reactive polymer, as a result of absorption of the hydrocarbons, in an inward direction which causes the compressible conductive covering to move inwardly towards the sensor wires and contact the sensor wires to create electrical conduction between the sensor wires where the hydrocarbon reactive polymer expands.

An embodiment of the present invention may further comprise: a hydrocarbon leak detection cable containing a feedback wire having feedback conductors and insulators surrounding the feedback conductors; sensor wires disposed adjacent to the insulators and separated by the insulators, the sensor wires having a uniform resistance per unit of length at the sensor wires; a conductive hydrocarbon reactive polymer placed over the feedback wire and the sensor wire that expands in the presence of hydrocarbons; a non-expandable permeable cover surrounding the conductive hydrocarbon reactive polymer that is permeable to hydrocarbons and directs forces from expansion of the conductive hydrocarbon reactive polymer, as a result of absorption of hydrocarbons, in an inward direction which causes the conductive hydrocarbon reactive polymer to move inwardly towards the sensor wires and contact the sensor wires to create electrical conduction between the sensor wires.

An embodiment of the present invention may further comprise: a method of making a hydrocarbon leak detection cable that includes providing feedback wire that has at least two feedback conductors; providing insulators that surround the feedback conductors, the insulators connected to form recesses between the insulators; placing sensor wires in the recesses between the conductors; placing a compressible conductive covering over the insulators and the sensor wires so that a gap is formed between the sensor wires and the compressible conductive covering; placing a hydrocarbon reactive polymer over the compressible conductive covering that expands in the presence of hydrocarbons and creates forces on the compressible conductive covering to cause the compressible conductive covering to contact the sensor wires and create a conductive path between the sensor wires at a location where the hydrocarbon reactive polymer has absorbed hydrocarbons from a hydrocarbon leak; placing a non-expandable permeable cover on the hydrocarbon reactive polymer that protects the hydrocarbon leak detection cable and causes forces created by the hydrocarbon reactive polymer as a result of the hydrocarbon reactive polymer expanding in the presence of hydrocarbons, the forces directed inwardly towards the compressible conductive covering.

An embodiment of the present invention may further comprise: a method of making a hydrocarbon leak detection cable that includes providing feedback wire that has at least two feedback conductors; providing insulators that surround the feedback conductors, the insulators connected to form recesses between the insulators; placing sensor wires in the recesses between the conductors; placing a conductive hydrocarbon reactive polymer over the sensor wires and the insulators that expands in the presence of hydrocarbons and creates forces on the compressible conductive covering to cause the compressible conductive covering to contact the sensor wires and create a conductive path between the sensor wires at a location where the conductive hydrocarbon reactive polymer has absorbed hydrocarbons from a hydrocarbon leak; placing a non-expandable permeable cover on the conductive hydrocarbon reactive polymer that protects the hydrocarbon leak detection cable and causes forces created by the conductive hydrocarbon reactive polymer as a result of the conductive hydrocarbon reactive polymer expanding in the presence of hydrocarbons, the forces directed inwardly towards the compressible conductive covering.

An embodiment of the present invention may further comprise: a method of making a hydrocarbon leak detection cable that includes providing a feedback wire having feedback conductors and insulators surrounding the feedback conductors; placing sensor wires adjacent to the insulators; placing a compressible conductive covering that surrounds the feedback wire and the sensor wires so that gaps are created between the sensor wires and the compressible conductive covering; placing a layer of hydrocarbon reactive polymer over the compressible conductive covering that expands in the presence of hydrocarbons and causes the compressive conductor to extend into the gaps and create a conductive path between the sensor wires.

An embodiment of the present invention may further comprise: a method of detecting a location of a hydrocarbon leak in a hydrocarbon leak detection cable that includes using a layer of hydrocarbon reactive polymer that surrounds a compressible conductive covering so that a gap is formed between the hydrocarbon reactive polymer, the compressible conductive covering placed over sensor wires so that a gap is formed between the compressible conductive covering and the sensor wires; detecting a hydrocarbon leak at the location on the hydrocarbon leak detection cable by allowing liquid or gas hydrocarbons from the hydrocarbon leak to penetrate the hydrocarbon leak detection cable at the location causing the hydrocarbon reactive polymer to absorb the hydrocarbons, which causes the hydrocarbon reactive polymer to swell so that the compressible conductive covering extends into the gaps and creates a conductive path between the sensor wires at the location; using detector electronics to determine where on the hydrocarbon leak detection cable the conductive path has occurred to determine the location of the hydrocarbon leak.

An embodiment of the present invention may further comprise: a method of making a hydrocarbon leak detection cable that includes providing a feedback wire having feedback conductors and insulators surrounding the feedback conductors; placing sensor wires adjacent to the insulators; placing a layer of conductive hydrocarbon reactive polymer over the feedback wire and the sensor wires so that gaps are created between the sensor wires and the conductive hydrocarbon reactive polymer, the conductive hydrocarbon reactive polymer expanding in the presence of hydrocarbons and extending into the gaps to create an electrically conductive path between the sensor wires.

An embodiment of the present invention may further comprise: a method of detecting a location of a hydrocarbon leak in a hydrocarbon leak detection cable that includes using a layer of conductive hydrocarbon reactive polymer that covers resistive sensor wires in the hydrocarbon leak detection cable; detecting a hydrocarbon leak at the location on the hydrocarbon leak detection cable by allowing hydrocarbons from the hydrocarbon leak to penetrate the hydrocarbon leak detection cable at the location causing the conductive hydrocarbon reactive polymer to absorb the hydrocarbons, which causes the conductive hydrocarbon reactive polymer to swell and expand into gaps between the conductive hydrocarbon reactive polymer and the resistive sensor wires to create an electrically conductive path between the sensor wires at the location; using detector electronics to determine where on the hydrocarbon leak detection cable the conductive path has occurred to determine the location of the hydrocarbon leak.

DETAILED DESCRIPTION OF THE EMBODIMENTS

Figure 1:
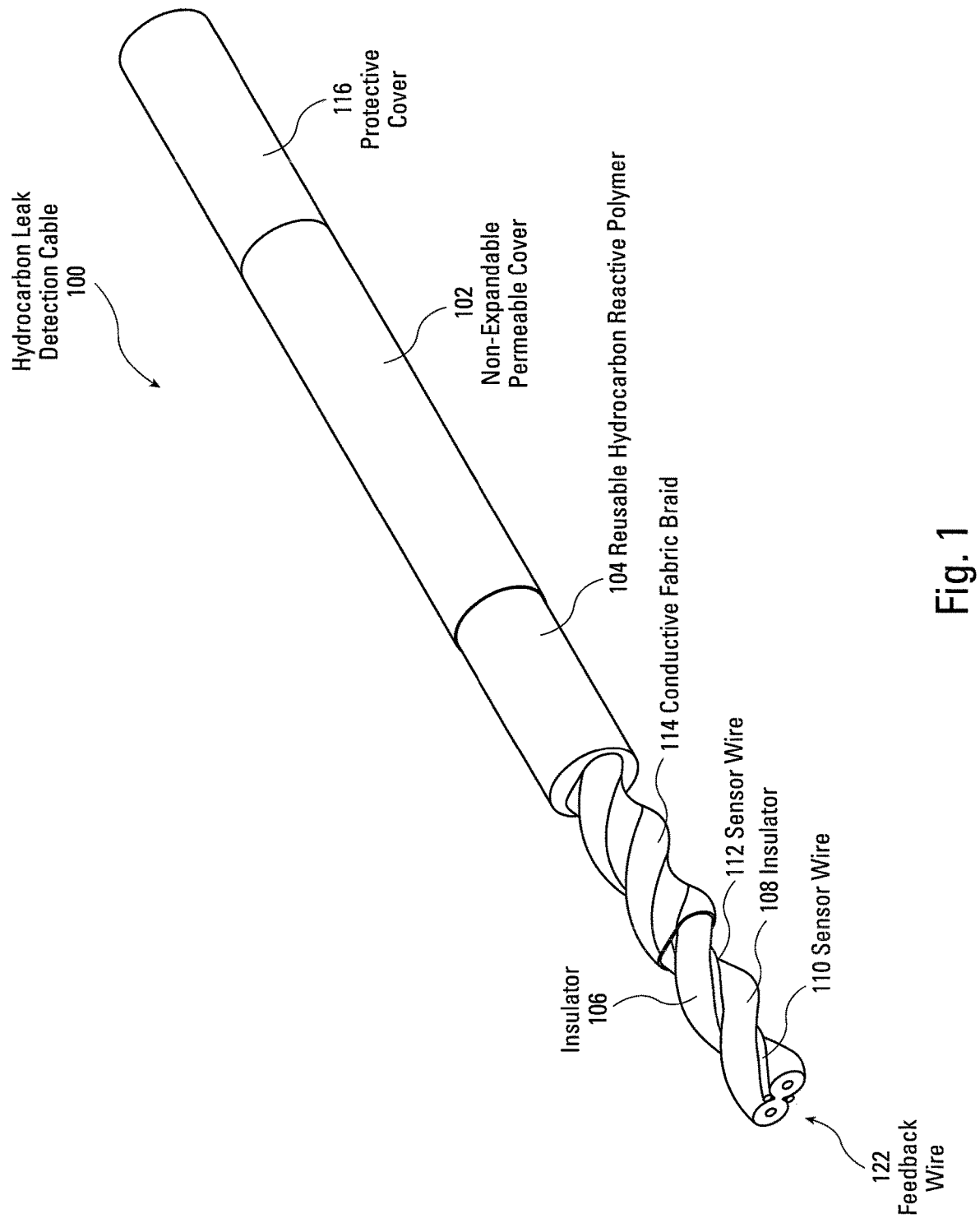
FIG. 1 is a partial cut-away view of an embodiment of a hydrocarbon leak detection cable.

FIG. 1 is a partial cut-away view of an embodiment of a hydrocarbon leak detection cable 100. As illustrated in FIG. 1, the hydrocarbon leak detection cable 100 has a non-expandable permeable cover 102. The non-expandable permeable cover 102 is intended to protect the hydrocarbon leak detection cable 100 from abrasions, punctures, and other potential damage. The non-expandable permeable cover 102 may be constructed from a plastic monofilament fiber that is braided in a manner that provides protection to the underlying layers. The monofilament fiber can be constructed from various plastics, and normally has a coverage of approximately 80%, so that 20% of the surface of the non-expandable permeable cover 102 is open to allow the passage of hydrocarbons. Of course, those percentages can be used including 90/10, 70/30, for example. The non-expandable permeable cover 102 may also be made from various types of polymer tape having perforations to allow the passage of a liquid such as liquid and gas hydrocarbons. Various other types of materials can be used to produce the non-expandable permeable cover 102 which does not allow substantial expansion as a result of forces created by the reusable hydrocarbon reactive polymer 104. In the regard, substantial expansion means that the non-expandable permeable cover 102 expands by more than about 10% of its diameter.

Under the non-expandable permeable cover 102, illustrated in FIG. 1, is a reusable hydrocarbon reactive polymer 104. In that regard, each of the layers or coverings illustrated in all of the embodiments may include additional layers. Other additional layers may exist, and it should be understood by those skilled in the art that the description provided herein, and the claims set forth hereafter, disclose a structure which may include additional layers or coverings. Terms such as "under," "cover," "on," "surrounds," and similar terms do not mean that any particular layer is directly connected to or directly adjacent to any other layer, but rather, other layers can exist in the structures in the embodiments disclosed. Further, these terms do not mean or imply "complete," but may be "partial."

Referring again to FIG. 1, hydrocarbons that pass through the non-expandable permeable cover 102 react with the reusable hydrocarbon reactive polymer 104 which expands or swells when subjected to, or placed in contact with, hydrocarbons. The reusable hydrocarbon reactive polymer 104 may comprise a petroleum fluid gel which absorbs hydrocarbons and is based upon polyolefin polymers. Polyolefin-based hydrophobic absorbance demonstrates selective absorption of hydrocarbon molecules in water solutions. This is more fully disclosed in a publication of the American Chemical Society relating to "*Macromolecules*" entitled "Petro gel: New Hydrocarbon (oil) Absorbent Based on Polyolefin Polymers" by Changwlo Nam, Houxiang Li, Gang Zhang, and T. C. Mike Chung, Department of Material Science and Engineering, the Pennsylvania State University, University Park, Pennsylvania 16802. In general, various rubber and nitrile-based materials are capable of absorbing hydrocarbons and swell in three dimensions as a result of the absorption of the hydrocarbons. These polymers absorb the hydrocarbon liquid and swell which creates a reactive force on the non-expandable permeable cover 102 so that the forces created by the swelling are directed inwardly towards the conductive fabric braid 114.

The conductive fabric braid, illustrated in FIG. 1, can be made of a conductive polymer coated mesh, a conductive polymer doped with conductive materials, or any type of conductive material, such as graphite, carbon, carbon nanoparticles, copper particles, silver particles, or other metal or conductive particles or nano-particles. A conductive fabric braid is a conductive covering that is placed over the feedback wire 122. Any desirable conductive covering can be used, such as a conductive fabric braid, a conductive tube, or other flexible covering. The covering can be applied by different techniques, including braiding, extrusion, etc.

The protective cover 116 can be any protective material that provides protection against punctures and is wear resistant. The protective cover 116 protects the non-expandable permeable cover 102 from punctures, wear, and other potential hazards.

Figure 3:
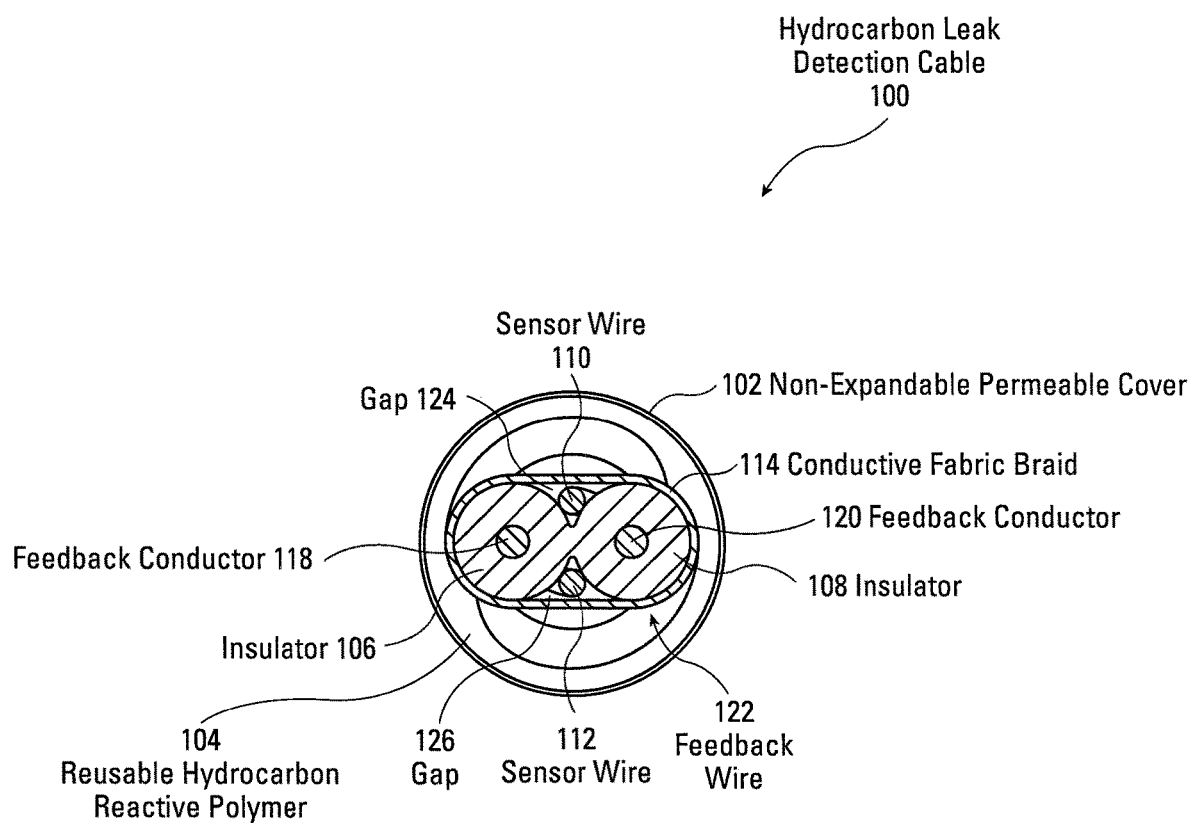
FIG. 3 is a cross-sectional view of the hydrocarbon leak detection cable illustrated in FIGS. 1 and 2, at the location indicated in FIG. 2.

The reusable hydrocarbon reactive polymer 104 can be made of any of the hydrocarbon reactive polymers described herein, such as Santoprene, which swells in the presence of hydrocarbons. Santoprene is just one example of a hydrocarbon reactive polymer, and while the description provided herein refers to Santoprene, any hydrocarbon reactive polymer can be used in place of Santoprene. The non-expandable permeable cover 102 can be made of a Kevlar braid, or other tightly wound fabric braid, which has recesses that are permeable to hydrocarbons. Again, Kevlar braid is used as one example of a tightly wound fabric braid that has minimal or no expansion resulting from the pressures created by the hydrocarbon reactive polymer. Feedback wire 122 has insulators 106, 108 which cover feedback conductors 118, 120, illustrated in FIG. 3. Sensor wires 110, 112 are placed in the intersections of insulators 106, 108, as illustrated in FIG. 3. The conductive fabric braid 114 is a fabric that is braided with conductors so that the conductive fabric braid 114 has conductance. The conductive fabric braid 114 has a sufficient amount of stiffness so that the conductive fabric braid 114 is not compliant with the feedback wire 122, as shown in more detail in FIG. 3. The conductive fabric braid can be made from conductive polymers, a mixture of conductive polymers and wires, or a nonconductive fabric braided with wires or conductive polymers.

The hydrocarbon leak detection cable 100 may be placed in locations that are difficult to access in order to detect hydrocarbon leaks. The hydrocarbon leak detection cable 100 may be placed in various locations, such as under above ground tanks, under below ground tanks, under a pipeline that rests in sand, etc. The hydrocarbon leak detection cable 100 may also be placed in a containment pipe of a double wall pipeline or transmission pipe, in a containment tank located under an underground tank and other locations that are difficult to access. It is therefore advantageous to be able to reuse the hydrocarbon leak detection cable 100. In that regard, the hydrocarbon leak detection cable 100 can be cleaned after a hydrocarbon leak has been sealed or stopped so that the reusable hydrocarbon reactive polymer 104 returns to its normal size prior to absorption of hydrocarbons. In that case, the reusable hydrocarbon reactive polymer 104 should be made from a material that can return to its original size after being compressed. Many rubbers and synthetic foams including silicon foams are capable being compressed and then expanding to an original size after being compressed, such as Santoprene.

The hydrocarbon leak detection cable 100 can be cleaned using various methods to remove hydrocarbons. For example, various solvents and soaps, including isopropyl alcohol, glycerin, propylene glycol have been used to remove the hydrocarbons.

Alternatively, materials can be used that do not return to their normal size prior to absorption of hydrocarbons and as such, the cable can simply be replaced. In many applications, this simply requires cable pulling to replace the cable with a new cable. These types of cables may be less expensive to implement and may be more reliable since some materials simply do not return fully to their pre-expanded size. As such, the embodiments disclosed herein, as well as the claims may refer to the use of materials that may be either reusable or may not be reusable and require replacement. In many applications, the hydrocarbon leak detection cable 100 may be laid out over a long distance to locate the position of any leak. For example, the hydrocarbon leak detection cable 100 can be used to locate the position of a leak in a long pipeline. The present invention uses conductance to determine the location of a leak. Conductance allows the hydrocarbon leak detection cable 100 to be laid out over miles, with the ability to detect the location of the leak within a few feet. Pipelines are normally laid out with an inner pipe, in which the hydrocarbons flow, and an outer containment pipe to contain any leaks that occur in the inner pipe. The pumping stations are normally laid out to be about five miles apart. The hydrocarbon leak detection cable 100 can be laid out in segments of five miles each, with the detector electronics placed at every other pumping station. In that manner, a leak detection cable which may be placed between the inner and outer pipes can be laid out for five miles in the first direction, and five miles in a second direction, so that ten miles of coverage can be obtained using one set of electronics. Of course, the detector electronics can be coupled wirelessly to a central facility that can alarm the operators of a pipeline to indicate a hydrocarbon leak and the location of the hydrocarbon leak. The cable can also be used on large underground tanks. In that regard, the hydrocarbon leak detection cable 100 can be used to locate the position of the leak with regard to the tank so that the location of excavation around the tank can be determined for sealing leaks.

Figure 2:
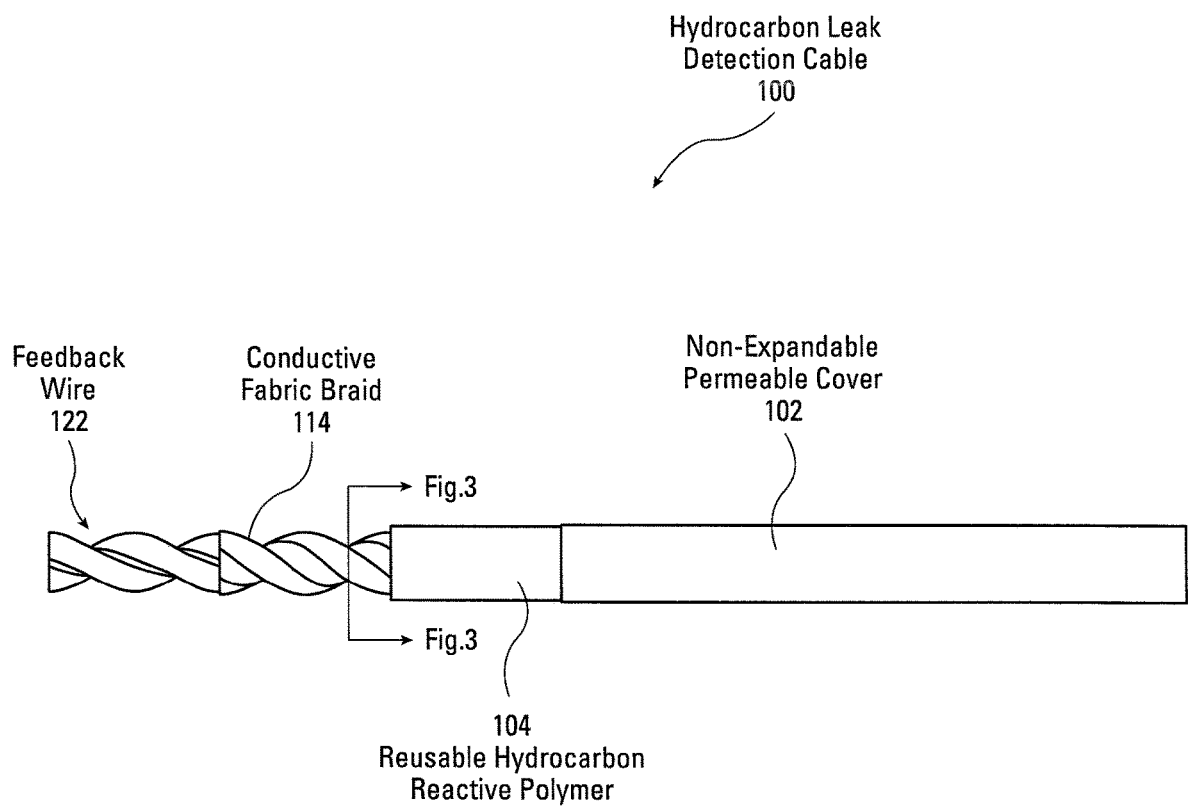
FIG. 2 is a side view of the hydrocarbon leak detection cable in FIG. 1.

FIG. 2 is a side partial cut-away view of the hydrocarbon leak detection cable 100 in FIG. 1. As illustrated in FIG. 2, the non-expandable permeable cover 102 covers the reusable hydrocarbon reactive polymer 104. The reusable hydrocarbon reactive polymer 104 covers the conductive fabric braid 114, which in turn covers the feedback wire 122.

FIG. 3 is a cutaway view of the hydrocarbon leak detection cable 100 illustrated in FIGS. 1 and 2. As illustrated in FIG. 3, a non-expandable cover 102 covers the reusable hydrocarbon reactive polymer 104. The non-expandable cover 102 may be a braided Kevlar that allows hydrocarbons to pass through the recesses of the braided Kevlar. Similarly, the protective cover 116, illustrated in FIG. 1, is also permeable to hydrocarbons. The reusable hydrocarbon reactive polymer 104, which may comprise Santoprene, surrounds the conductive fabric braid 114. Located at the two intersections of insulator 106 and insulator 108 are sensor wire 110 and sensor wire 112. The sensor wires 110, 112 may be fused or bonded to the insulators 106, 108 so that the sensor wires 110, 112 do not move and contact the conductive fabric braid 114.

Feedback conductor 118 is centrally located in insulator 106, while feedback conductor 120 is centrally located in insulator 108. Insulators 106, 108 form a figure eight configuration in a cross-section, as shown in FIG. 3, which is a typical configuration for detector cables. For example, the same conductor cable used for sensing moisture can be used in the present application for sensing hydrocarbons.

As further shown in FIG. 3, the conductive fabric braid 114 has sufficient structure and stiffness that gaps 124, 126 are created between sensor wire 110 and conductive fabric braid 114, and sensor wire 112 and conductive fabric braid 114, respectively.

In operation, hydrocarbons from a leak penetrate the non-expandable cover 102 and contact the reusable hydrocarbon reactive polymer 104. The reusable hydrocarbon reactive polymer 104 swells as the reusable hydrocarbon reactive polymer 104 absorbs the hydrocarbons. The non-expandable cover 102 does not allow the reusable hydrocarbon reactive polymer 104 to expand in an outward direction, so that the expansion of the reusable hydrocarbon reactive polymer 104 is directed inwardly towards the conductive fabric braid 114. The conductive fabric braid 114 deflects inwardly in response to the swelling of the reusable hydrocarbon reactive polymer 104 and creates a conductive contact between the conductive fabric braid 114 and sensor wires 110 112. In this manner, short is created between the sensor wires 110, 112. The sensor wires 110, 112 are resistive wires that have a slight resistance created by various means, such as alloys included in the wire, so that the wire has a specific resistance per unit of length. The sensor wires 110, 112 are connected to the feedback conductors 118, 120 at the end of the wire. For example, the hydrocarbon leak detection cable 100 may extend for a distance of five miles between pumping stations. At the end of the five mile stretch, the sensor wire 110 is connected to the feedback conductor 118, and the sensor wire 112 is connected to the feedback conductor 120, or vice versa. By detecting the difference in current passing through the sensor wires 110, 112 to the feedback conductors 118, 120, respectively, when a short occurs, the distance to the short along the hydrocarbon leak detection cable 100 can be determined as a result of the uniform and consistent resistance of the sensor wires 110, 112 per unit length. This allows the system to accurately determine the location of a hydrocarbon leak as a result of a determination of the location of the short between sensor wires 110, 112, due to the conductive fabric braid 114 creating a short circuit.

Figure 4:
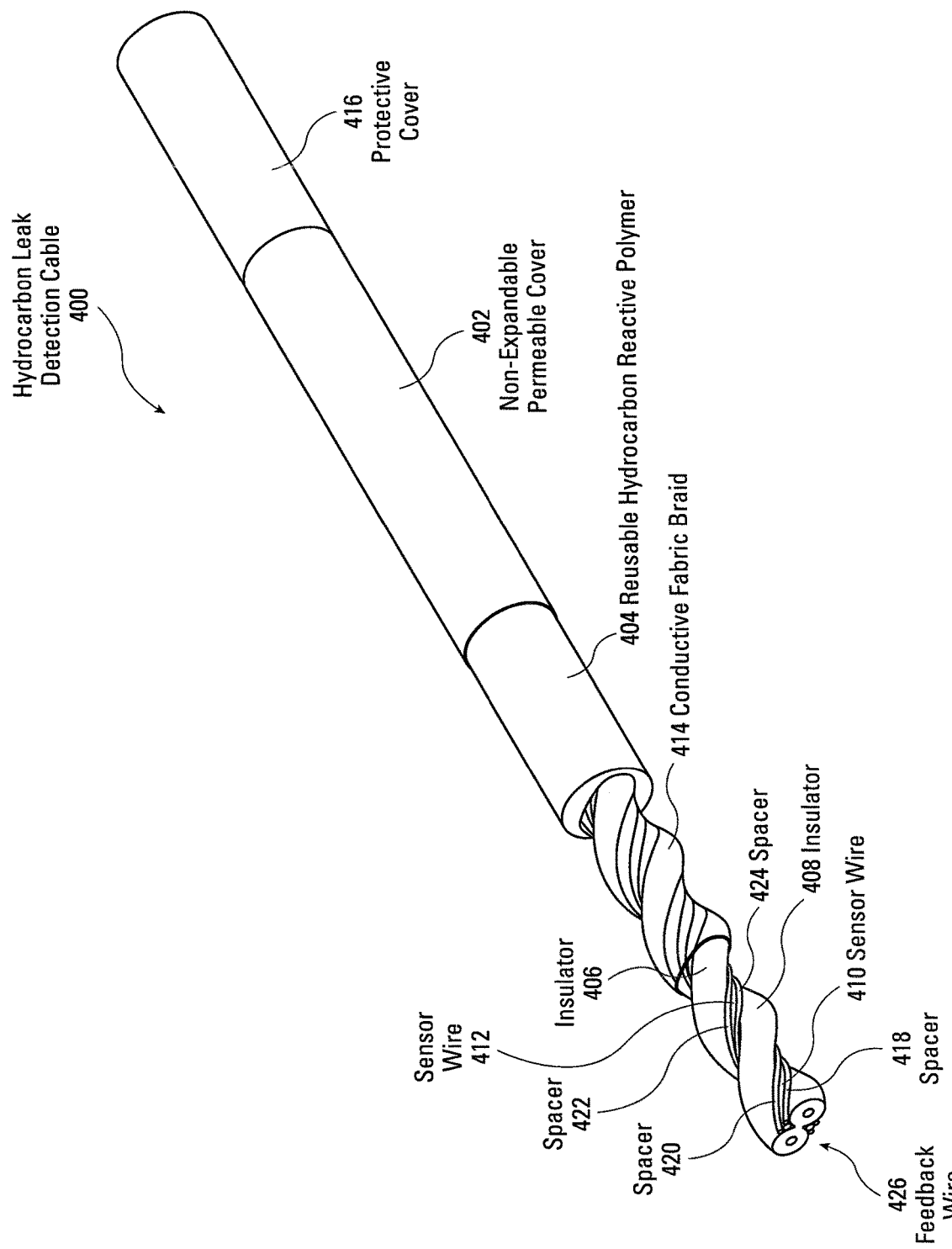
FIG. 4 is a partial cut-away view of another embodiment of a hydrocarbon leak detection cable.
Figure 5:
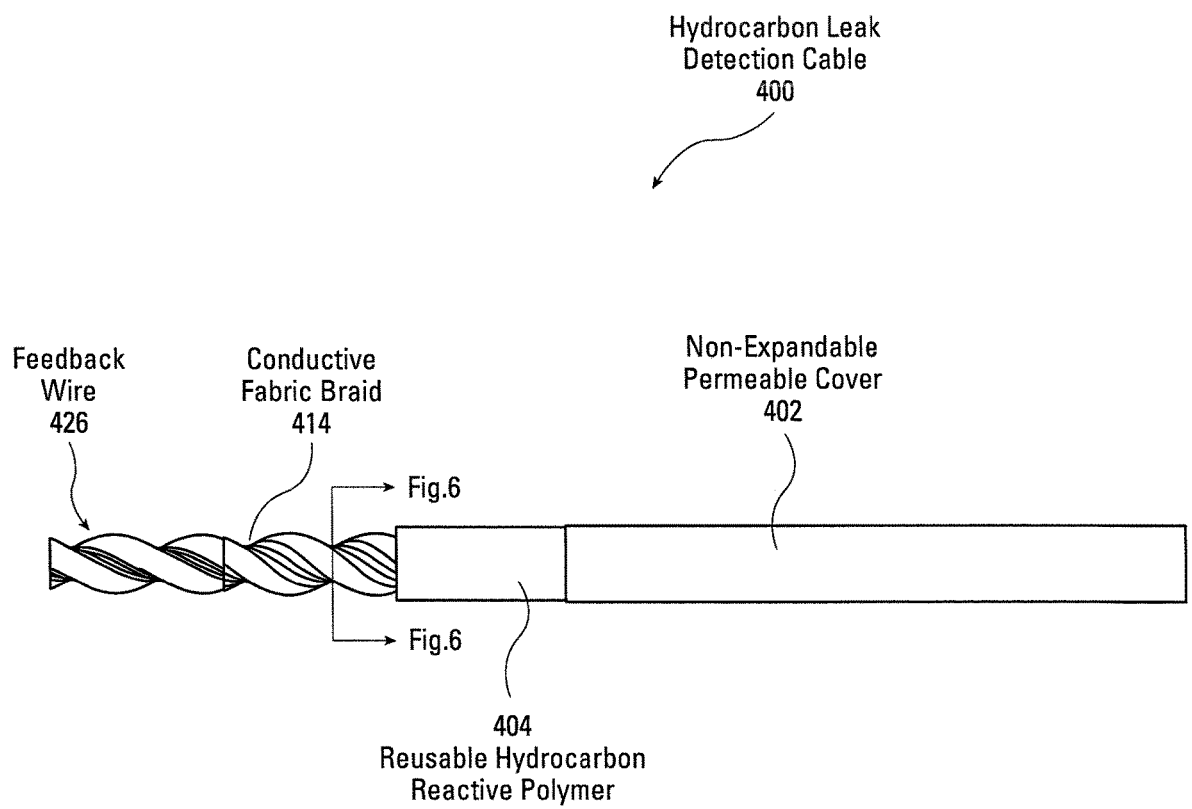
FIG. 5 is a side view of the hydrocarbon leak detection cable in FIG. 4.
Figure 6:
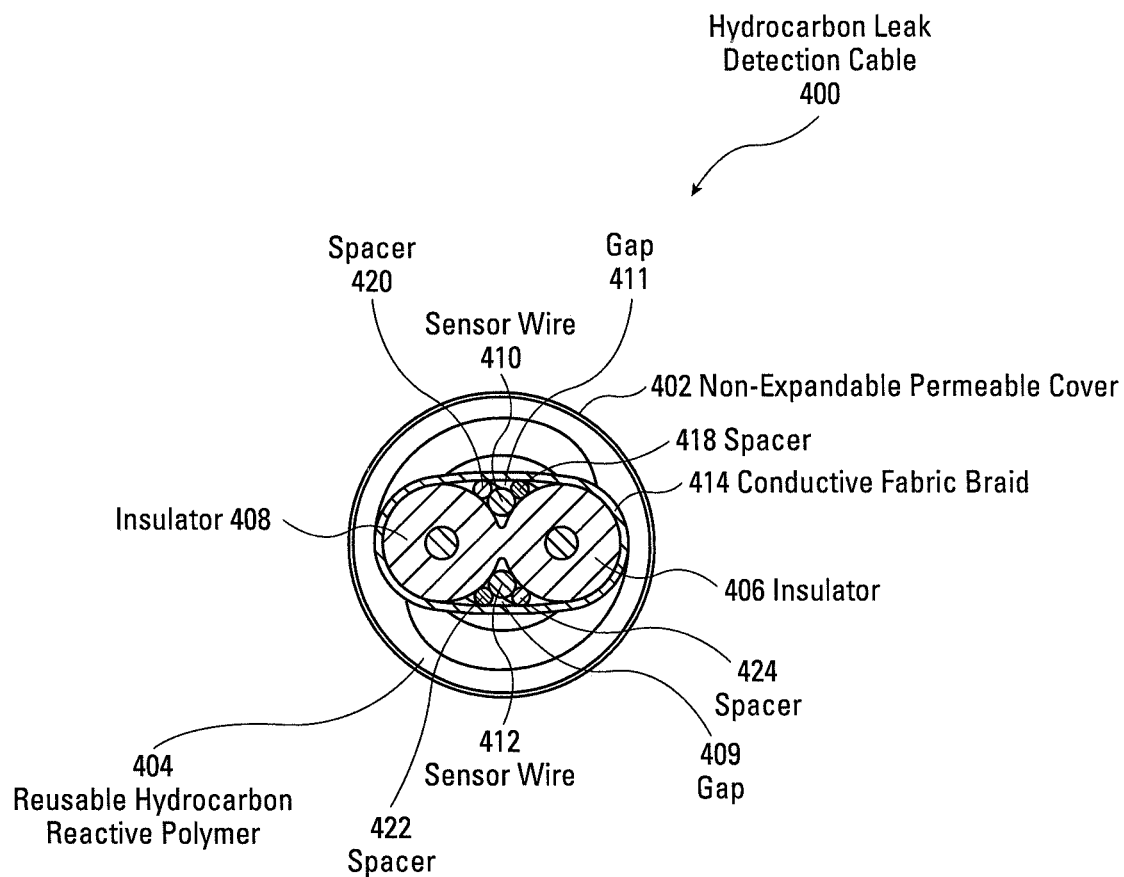
FIG. 6 is a cross-sectional view of the hydrocarbon leak detection cable illustrated in FIGS. 4 and 5, at the location indicated in FIG. 5.

FIGS. 4-6 illustrate another embodiment of the present invention. As shown in FIG. 4, the hydrocarbon leak detection cable 400 has a protective cover 416 similar to the protective cover 116 illustrated in FIG. 1. Protective cover 416 surrounds the non-expandable permeable cover 402. Again, the non-expandable permeable cover 402 can be constructed from various plastic monofilament fibers that do not expand or have very little expansion, and are braided in a manner that provides protection to the underlying layers, such as the reusable hydrocarbon reactive polymer 404. The non-expandable permeable cover 402 has recesses through the braid that allow liquid and gas hydrocarbons to seep through the non-expandable permeable cover 402 and penetrate the reusable hydrocarbon reactive polymer 404. The reusable hydrocarbon reactive polymer 404 swells as the reusable hydrocarbon reactive polymer 404 absorbs hydrocarbons. The reusable hydrocarbon reactive polymer 404 does not swell in the presence of water or other moisture. The reusable hydrocarbon reactive polymer 404 may comprise a Santoprene material or polyolefin polymers. Polyolefin absorbents demonstrate selective absorption of hydrocarbon molecules in water solutions. Again, this is more fully disclosed in a publication of the American Chemical Society relating to "*Macromolecules*" entitled "Petro gel: New Hydrocarbon (oil) Absorbent Based on Polyolefin Polymers" by Changwlo Nam, Houxiang Li, Gang Zhang, and T. C. Mike Chung, Department of Material Science and Engineering, the Pennsylvania State University, University Park, Pennsylvania 16802. Various rubber and nitrile-based materials are capable of absorbing hydrocarbons and swell in three dimensions as a result of the absorption of the hydrocarbons. These polymers absorb the hydrocarbon liquid and swell which creates a reactive force on the non-expandable permeable cover 402 so that the forces created by the swelling are directed inwardly towards the conductive fabric braid 414 so that the non-expandable permeable cover 402 allows little or no expansion. As further shown in FIG. 4, sensor wires 410, 412 are tucked or placed between the insulator 406 and spacers 418, 420. This is more clearly shown in FIG. 6.

FIG. 5 is a side view of the hydrocarbon leak detection cable 400. As illustrated in FIG. 5, the non-expandable permeable cover 402 covers the reusable hydrocarbon reactive polymer 404. The reusable hydrocarbon reactive polymer 404 is described above and covers the conductive fabric braid 414. A description of a conductive fabric braid 414 is also provided above. The conductive fabric braid 414 also covers the feedback wire 426.

FIG. 6 is a cross-sectional view of the hydrocarbon leak detection cable 400 at the location indicated in FIG. 5. As illustrated in FIG. 6, a non-expandable permeable cover 402 covers the reusable hydrocarbon reactive polymer 404. The reusable hydrocarbon reactive polymer 404 fills the area between the non-expandable permeable cover 402 and the conductive fabric braid 414. Sensor wire 410 is placed against insulators 406, 408. Spacers 418, 420 are placed between the conductive fabric braid 414 and insulators 406, 408 so that spacers 418, 420 are located outwardly from sensor wire 410 and create a gap 411 between the sensor wire 410 and the conductive fabric braid 414. Similarly, spacers 422, 424 are located between the insulator 408, 406, respectively, and create a gap 409 between the conductive fabric braid 414 and sensor wire 412. Spacers 418, 420 may be bonded to the sensor wire 410 and/or bonded to insulators 406, 408, respectively. Similarly, spacers 422, 424 may be bonded to sensor wire 412 and/or insulators 408, 406 respectively. The spacers 418, 420, 422, 424 can be bonded using adhesives, through heat fusion, or any desirable method of maintaining the spacers 418-424 in place, especially during twisting of the hydrocarbon leak detection cable 400.

In operation, liquid and gas hydrocarbons permeate the non-expandable permeable cover 402 and the protective cover 416, illustrated in FIG. 4. Hydrocarbons then penetrate the reusable hydrocarbon reactive polymer 404, which absorbs the hydrocarbons and swells. Outward swelling is contained by the non-expandable permeable cover 402 so that forces are created inwardly and the non-expandable permeable cover 402 expands inwardly to compress the conductive fabric braid 414. Spacers 418, 420 create a gap 411, which prevents accidental contact by the sensor wire 410 with the conductive fabric braid 414. As the reusable hydrocarbon reactive polymer 404 expands in an inward direction, the conductive fabric braid 414 is pushed inwardly towards sensor wire 410 so that the conductive fabric braid 414 extends into the gap 411. Electrical contact then occurs between the sensor wire 410 and the conductive fabric braid 414. Similarly, the reusable hydrocarbon reactive polymer 404 forces the conductive fabric braid 414 inwardly past spacers 422, 424 into gap 409 so that the conductive fabric braid 414 contacts sensor wire 412. The conductive fabric braid 414 consequently creates a short circuit between sensor wire 410 and sensor wire 412 at the location of the hydrocarbon leak, which would cause the reusable hydrocarbon reactive polymer 404 to expand. The location of the hydrocarbon leak can then be determined using conduction techniques by sensing the change in current in the sensor wires 410, 412.

Figure 7:
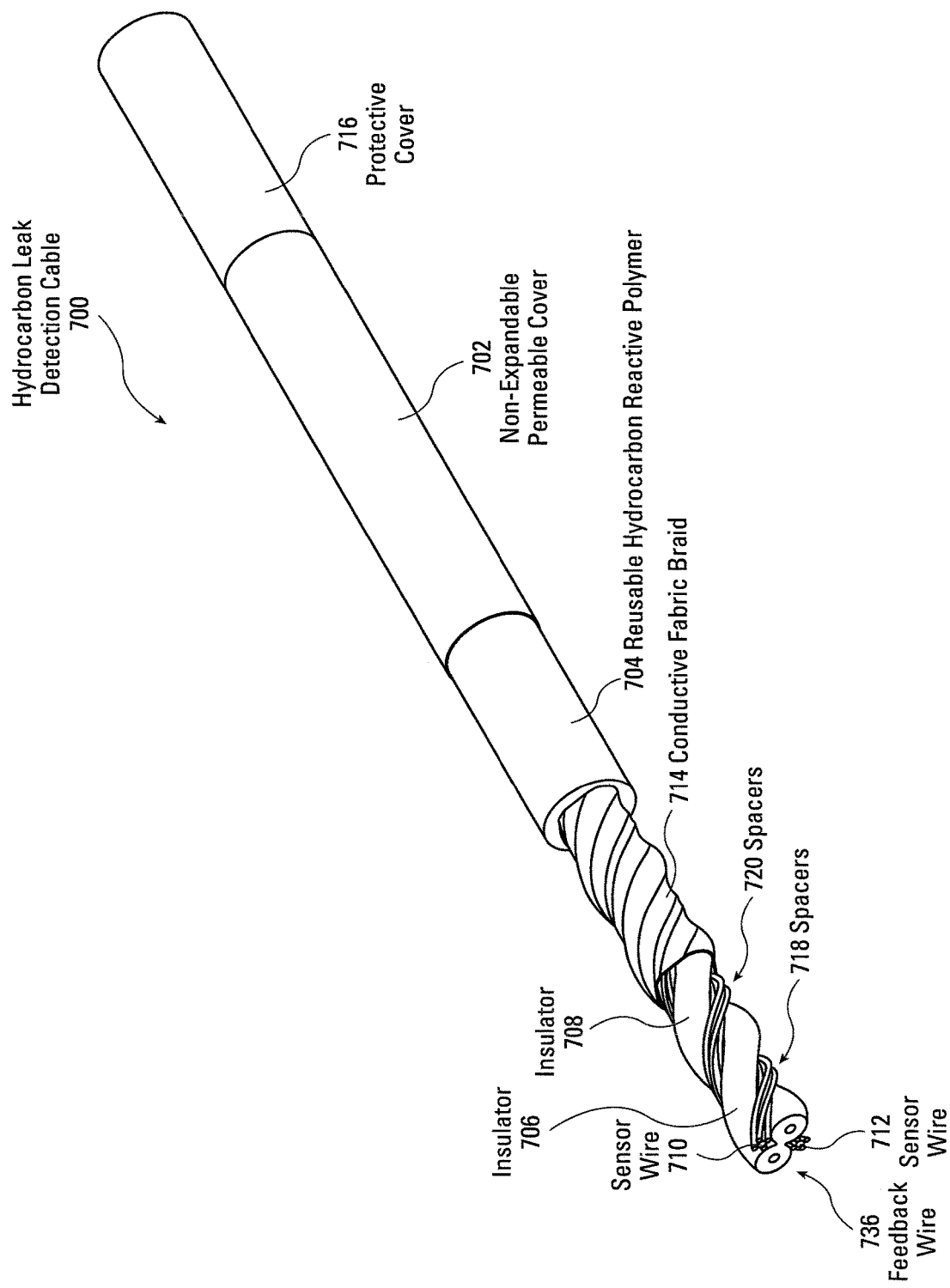
FIG. 7 is a partial cut-away view of another embodiment of a hydrocarbon leak detection cable.

FIG. 7 is a schematic isometric view of another embodiment of a hydrocarbon leak detection cable 700. As illustrated in FIG. 7, protective cover 716, which is permeable to hydrocarbons, is placed over a non-expandable permeable cover 702. Non-expandable permeable cover 702 is also permeable to hydrocarbons in the same manner as disclosed in the other embodiments. Non-expandable permeable cover 702 covers the reusable hydrocarbon reactive polymer 704, which absorbs hydrocarbons and swells as the reusable hydrocarbon reactive polymer 704 absorbs hydrocarbons. A conductive fabric braid 714 is placed over the feedback wire 736, which includes insulators 706, 708 and sensor wires 710, 712. The conductive fabric braid 714 also covers the spacers 718, 720.

Figure 8:
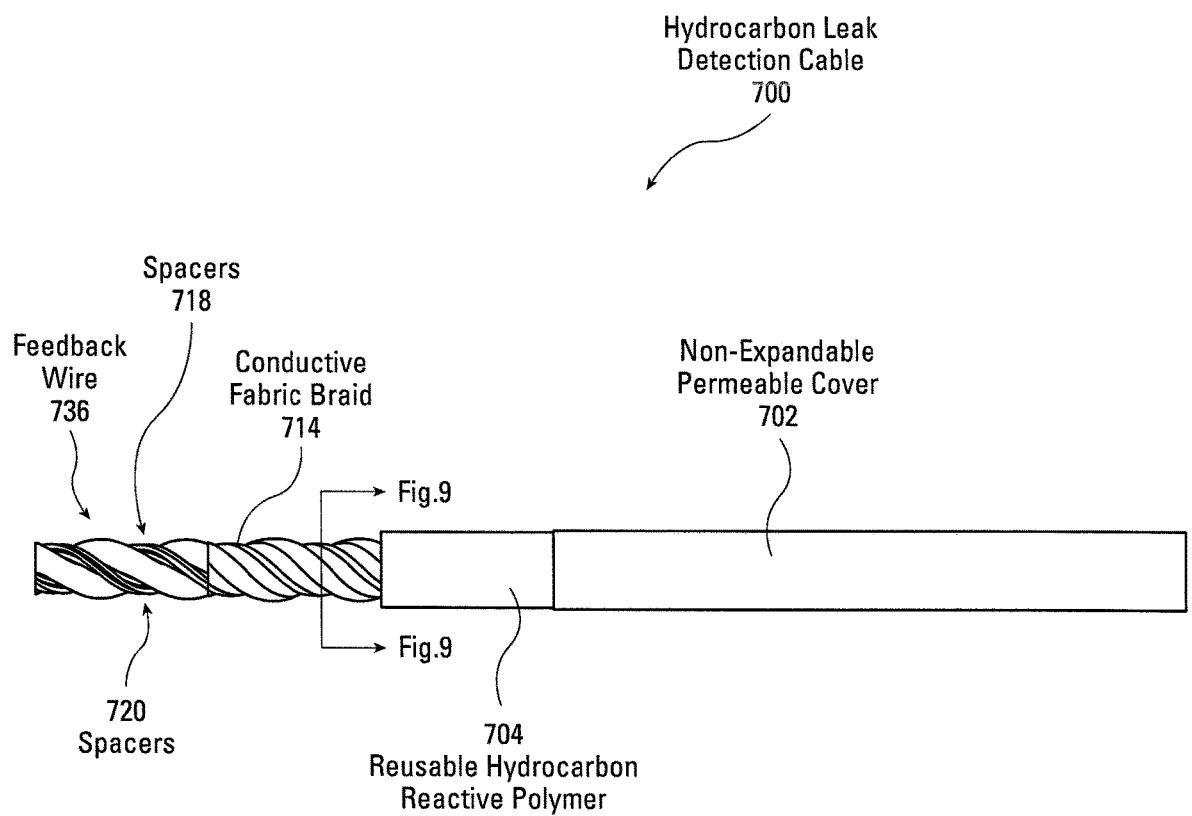
FIG. 8 is a side view of the hydrocarbon leak detection cable in FIG. 7.

FIG. 8 is a side view of the hydrocarbon leak detection cable 700. FIG. 8 discloses the non-expandable permeable cover 702, the reusable hydrocarbon reactive polymer 704, the conductive fabric braid 714, spacers 718, spacers 720, and the feedback wire 736.

Figure 9:
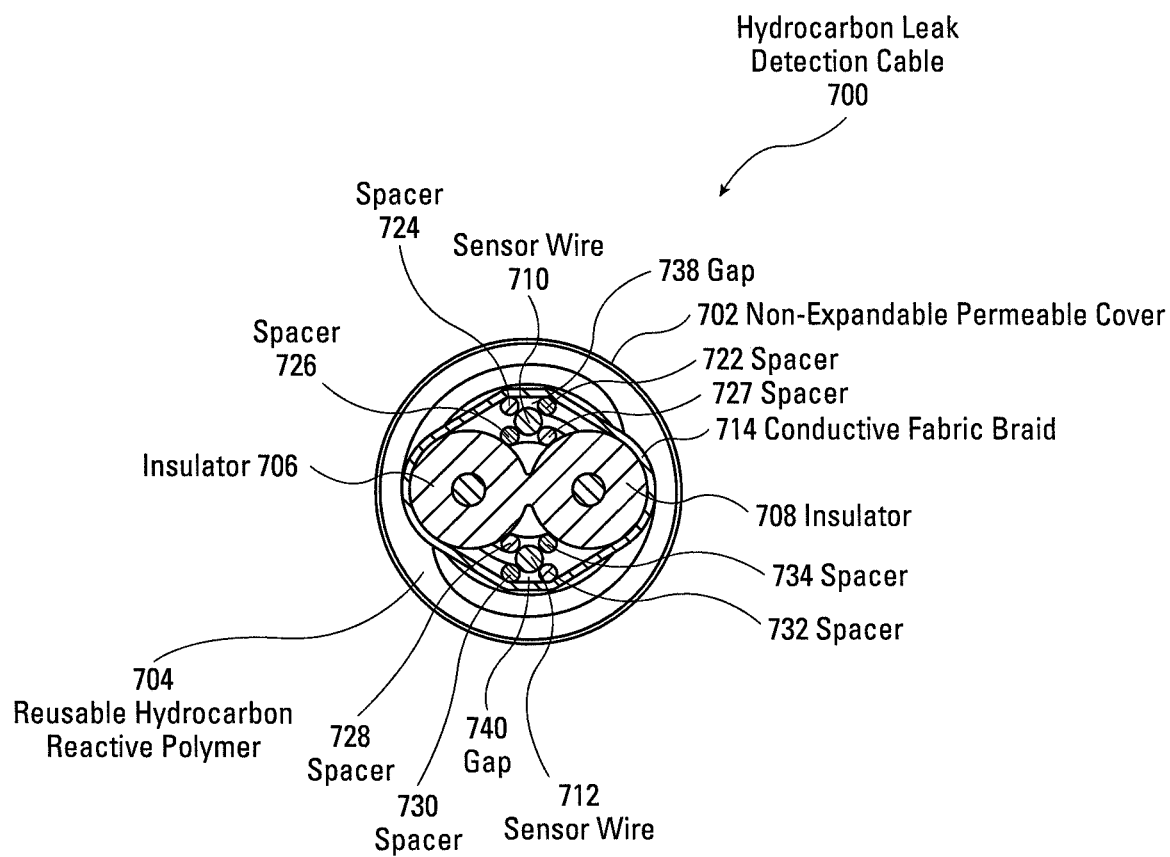
FIG. 9 is a cross-sectional view of the hydrocarbon leak detection cable illustrated in FIGS. 7 and 8, at the location indicated in FIG. 8.

FIG. 9 is a cross-sectional view of the cross-section illustrated in FIG. 8. As shown in FIG. 9, the non-expandable permeable cover 702 covers the reusable hydrocarbon reactive polymer 704. A conductive fabric braid 714 is covered by the reusable hydrocarbon reactive polymer 704. The conductive fabric braid 714 surrounds the spacers 722, 724, 730, and 732. Spacers 726, 727, 724, 722, surround the sensor wire 710. Spacers 726, 727, 722, 724 may be braided around the sensor wire 710 so that the spacers stay in place around the sensor wire 710. Similarly, spacers 728, 730, 732, 734 may be braided around sensor wire 712 to maintain the position of the spacers around sensor wire 712. Otherwise, bonding can be used to secure the spacers to the sensor wire. Spacers 722, 724 create a gap 738 between the conductive fabric braid 714 and sensor wire 710. Similarly, spacers 730, 732 create a gap 740 between sensor wire 712 and the conductive fabric braid 714.

In operation, when hydrocarbons leak, the hydrocarbons penetrate the non-expandable permeable cover 702 and are absorbed by the reusable hydrocarbon reactive polymer 704 as shown in FIG. 9. As a reusable hydrocarbon reactive polymer 704 expands inwardly, the conductive fabric braid 714 is pushed inwardly and forces the conductive fabric braid 714 to contact the sensor wire 710. Similarly, the reusable hydrocarbon reactive polymer 704 forces the conductive fabric braid 714 inwardly until it contacts sensor wire 712. In that fashion, a short circuit is created between sensor wire 710 and sensor wire 712. The location of the short circuit is determined by sensing the change in current on the sensor wires 710, 712.

Figure 10:
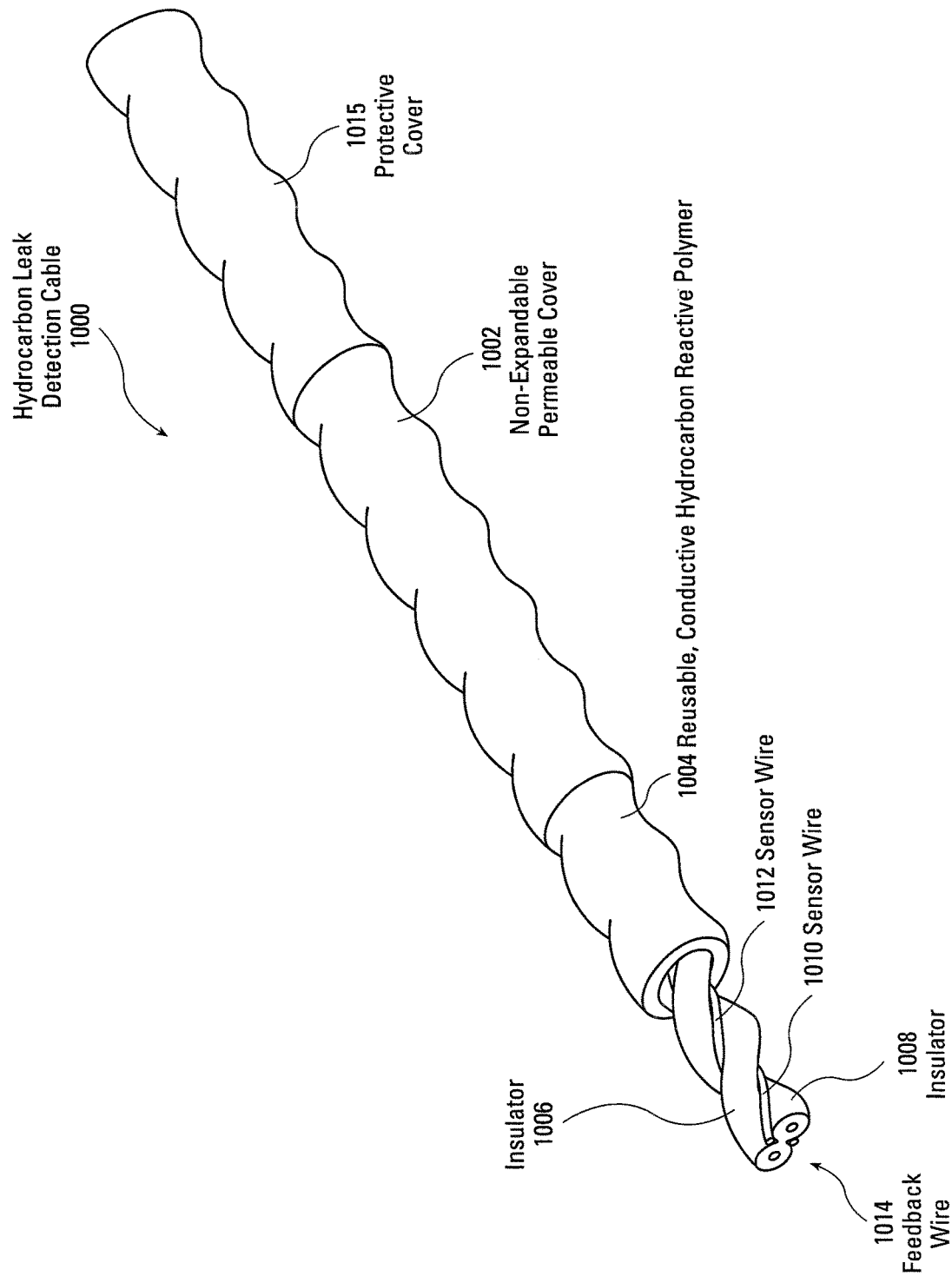
FIG. 10 is a partial cut-away view of another embodiment of a hydrocarbon leak detection cable.

FIG. 10 is an isometric view of another embodiment of hydrocarbon leak detection 1000. As illustrated in FIG. 10, a protective cover 1015 surrounds a non-expandable permeable cover 1002. Both the protective over 1015 and the non-expandable permeable cover 1002 allow hydrocarbons to permeate. A non-expandable permeable cover 1002 surrounds the reusable, conductive hydrocarbon reactive polymer 1004, which absorbs hydrocarbons and swells. The non-expandable permeable cover 1002 substantially prevents outward expansion so the reusable, conductive hydrocarbon reactive polymer 1004 swells inwardly. The reusable, conductive hydrocarbon reactive polymer 1004 surrounds feedback wire 1014, which includes insulators 1006, 1008. Sensor wires 1010, 1012 are placed in the intersection of the insulators 1006, 1008, as more clearly illustrated in FIG. 12.

Figure 11:
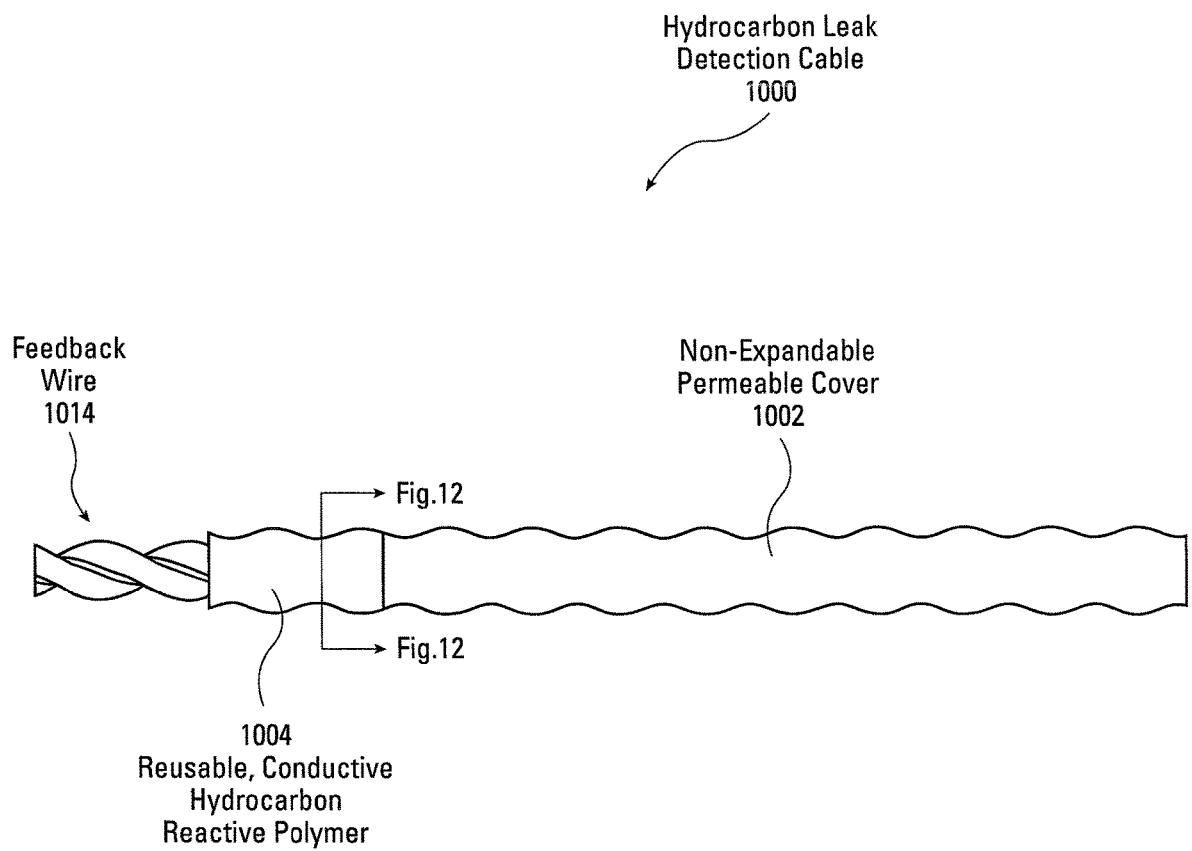
FIG. 11 is a side view of the hydrocarbon leak detection cable in FIG. 10.

FIG. 11 is a side view of the hydrocarbon leak detection cable 1000, as illustrated in FIG. 10. As illustrated in FIG. 11, the hydrocarbon leak detection cable 1000 includes a non-expandable permeable cover 1002, a reusable, conductive hydrocarbon reactive polymer 1004, and a feedback wire 1014.

Figure 12:
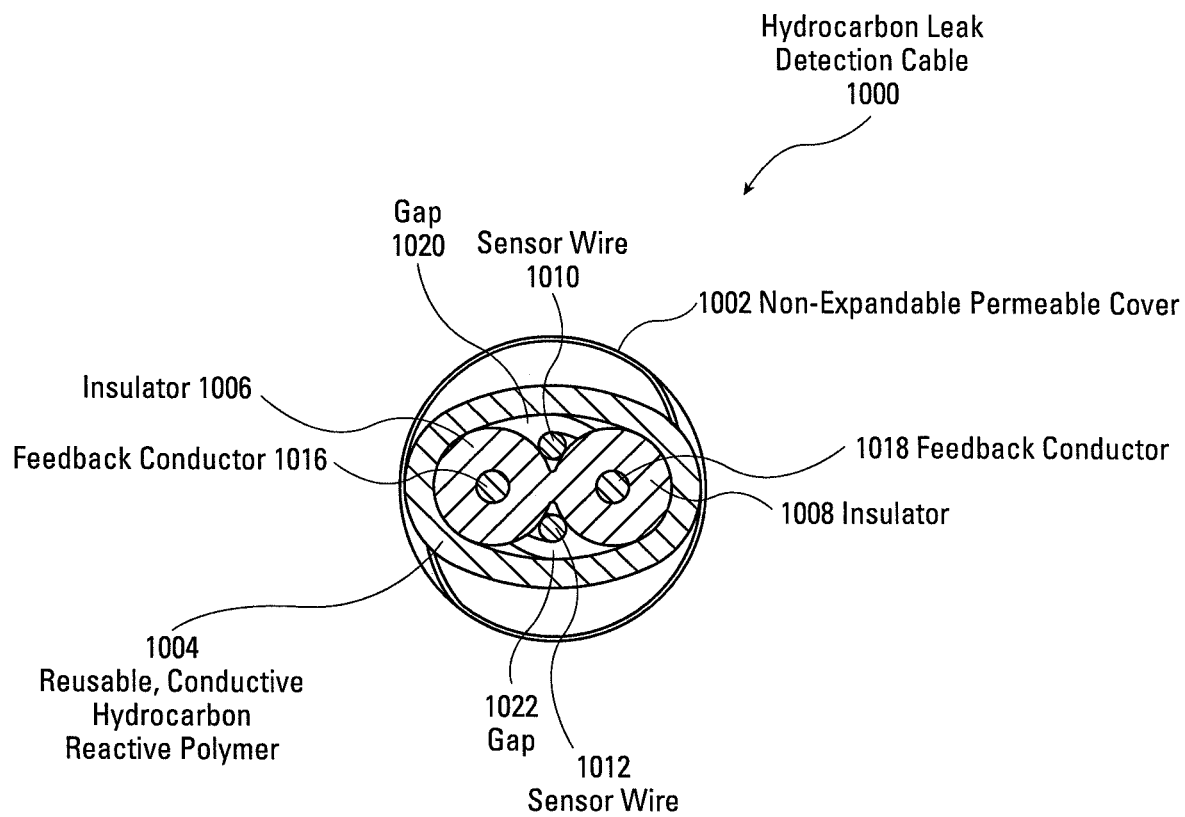
FIG. 12 is a cross-sectional view of the hydrocarbon leak detection cable illustrated in FIGS. 10 and 11, at the location indicated in FIG. 11.

FIG. 12 is a cross-sectional view of the hydrocarbon leak detection cable 1000 at the location indicated in FIG. 11. As illustrated in FIG. 12, the non-expandable permeable cover 1002 covers the reusable, conductive hydrocarbon reactive polymer 1004. The reusable, conductive hydrocarbon reactive polymer 1004 may comprise a Santoprene or other expandable material that includes conductive particles, such as carbon particles, including carbon nanotubes. Other conductive particles can be used to dope the reusable, conductive hydrocarbon reactive polymer 1004 to make it conductive, including metal particles. The reusable, conductive hydrocarbon reactive polymer 1004 surrounds insulator 1006, 1008 and sensor wires 1010, 1012. As a result of the shape of the reusable, conductive hydrocarbon reactive polymer 1004, gaps 1020, 1022 are created between the reusable, conductive hydrocarbon reactive polymer 1004 and sensor wires 1010, 1012. Feedback conductors 1016, 1018 are disposed in insulators 1006, 1008, respectively. In operation, when a hydrocarbon liquid penetrates the non-expandable permeable cover 1002, the hydrocarbon is absorbed by the reusable, conductive hydrocarbon reactive polymer 1004, which swells and is contained by the non-expandable permeable cover 1002. As such, reusable, conductive hydrocarbon reactive polymer 1004 expands inwardly and touches the sensor wires 1010, 1012, creating a short circuit. The location of the short circuit and, consequently, the location of the hydrocarbon leak, is determined by the amount of current flowing through sensor wires 1010, 1012, as explained in more detail above.

Figure 13:
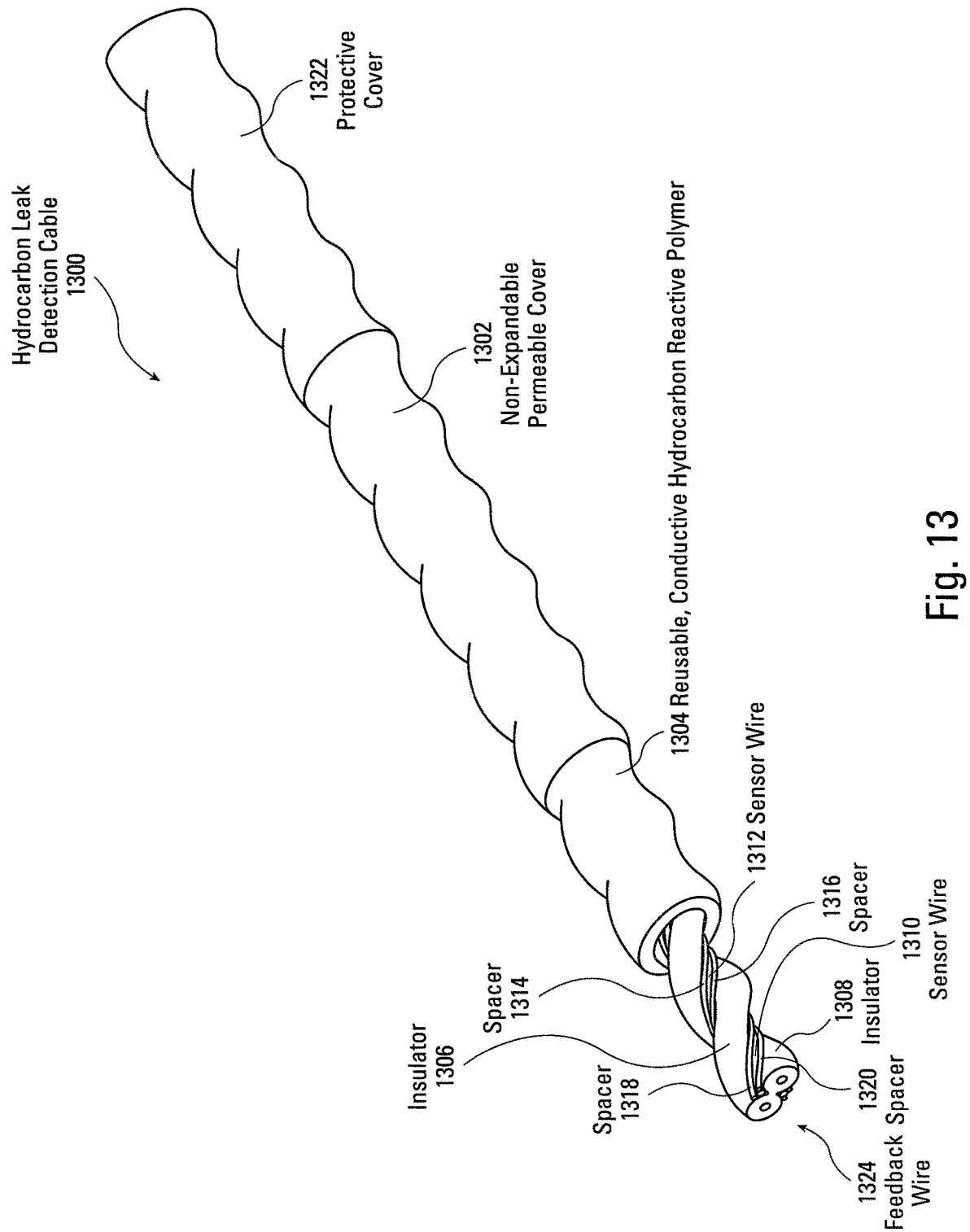
FIG. 13 is a partial cut-away view of another embodiment of a hydrocarbon leak detection cable.

FIG. 13 is an isometric cutaway view of another embodiment of the hydrocarbon leak detection cable 1300. As illustrated in FIG. 13, protective cover 1322 protects the non-expandable permeable cover 1302 and allows hydrocarbons to penetrate the protective cover 1322. The non-expandable permeable cover 1302 also allows hydrocarbons to pass through to the reusable, conductive hydrocarbon reactive polymer 1304. The reusable, conductive hydrocarbon reactive polymer 1304 absorbs the hydrocarbon liquids and swells in an inward direction. The reusable, conductive hydrocarbon reactive polymer 1304 surrounds a feedback wire 1324, which includes insulators 1306, 1308. The reusable, conductive hydrocarbon reactive polymer 1304 also surrounds spacers 1314, 1316 and sensor wire 1312, as well as spacers 1318, 1320 and sensor wire 1310.

Figure 14:
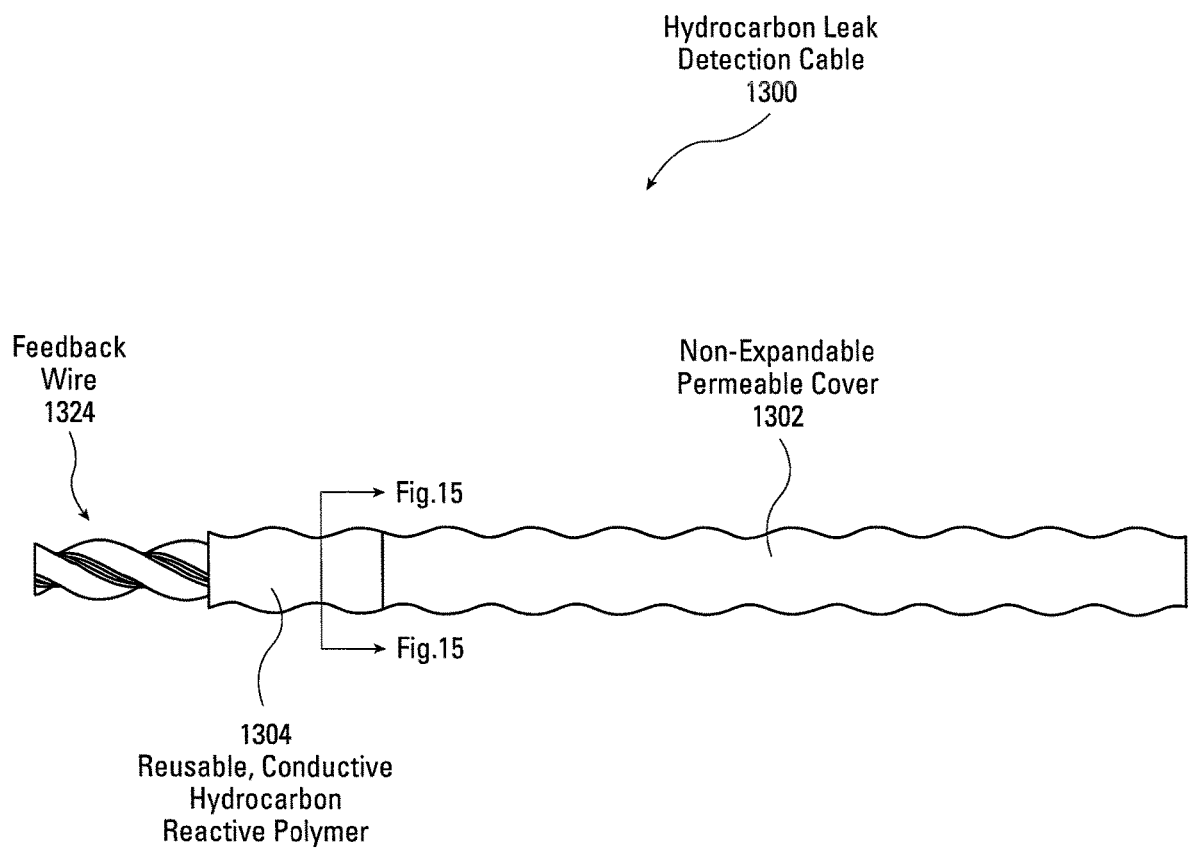
FIG. 14 is a side view of the hydrocarbon leak detection cable in FIG. 13.

FIG. 14 is a schematic cutaway, side view of the hydrocarbon leak detection cable 1300. As illustrated in FIG. 14, the non-expandable permeable cover 1302 is shown as surrounding the reusable, conductive hydrocarbon reactive polymer 1304. These layers cover the feedback wire 1324.

Figure 15:
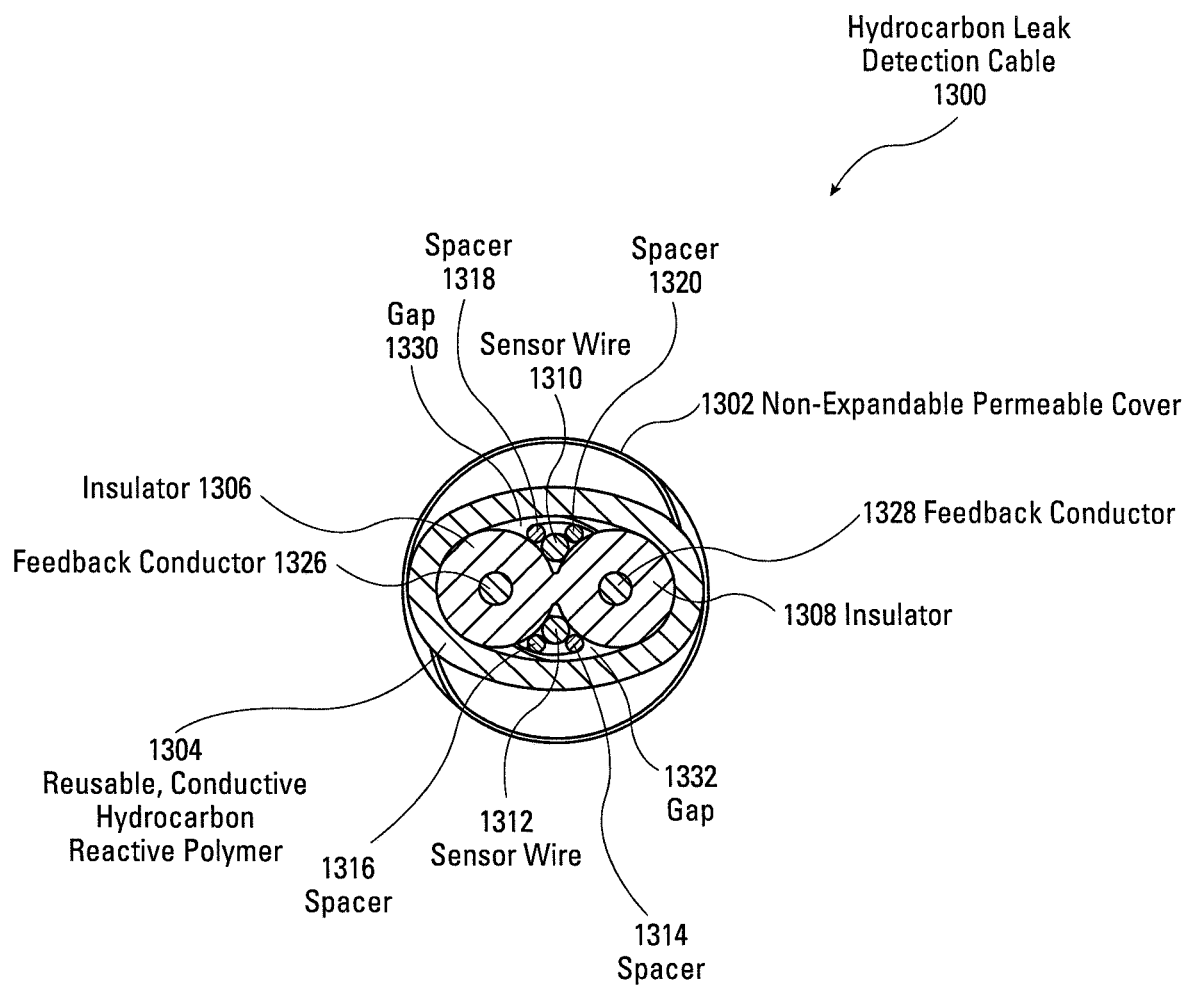
FIG. 15 is a cross-sectional view of the hydrocarbon leak detection cable illustrated in FIGS. 13 and 14, at the location indicated in FIG. 14.

FIG. 15 is a cutaway view at the location indicated in FIG. 14. As illustrated in FIG. 15, the non-expandable permeable cover 1302 surrounds the reusable, conductive hydrocarbon reactive polymer 1304. The reusable, conductive hydrocarbon reactive polymer 1304 has a shape that surrounds the insulator 1306 and insulator 1308, as well as spacers 1318, 1320 and sensor wire 1310. The reusable, conductive hydrocarbon reactive polymer 1304 also surrounds spacers 1316, 1314 and sensor wire 1312. The shape of the reusable, conductive hydrocarbon reactive polymer 1304 creates a gap 1330 between the sensor wire 1310 and the reusable, conductive hydrocarbon reactive polymer 1304. In addition, a gap 1332 is created by the shape of the reusable, conductive hydrocarbon reactive polymer 1304 between the sensor wire 1312 and the reusable, conductive hydrocarbon reactive polymer 1304. Feedback conductors 1326, 1328 are disposed in insulators 1306, 1308, respectively.

In operation, the reusable, conductive hydrocarbon reactive polymer 1304 absorbs hydrocarbons that pass through the non-expandable permeable cover 1302 and swells in an inward direction. The swelling causes the reusable, conductive hydrocarbon reactive polymer 1304 to penetrate the gap 1330 and creates an electrical connection with the sensor wire 1310. Similarly, the reusable, conductive hydrocarbon reactive polymer 1304 fills gap 1332 and creates an electrical connection with the sensor wire 1312. In this manner, the reusable, conductive hydrocarbon reactive polymer 1304 causes a short circuit between sensor wire 1310 and sensor wire 1312 at the location where the reusable, conductive hydrocarbon reactive polymer 1304 absorbs a hydrocarbon liquid and swells.

Figure 16:
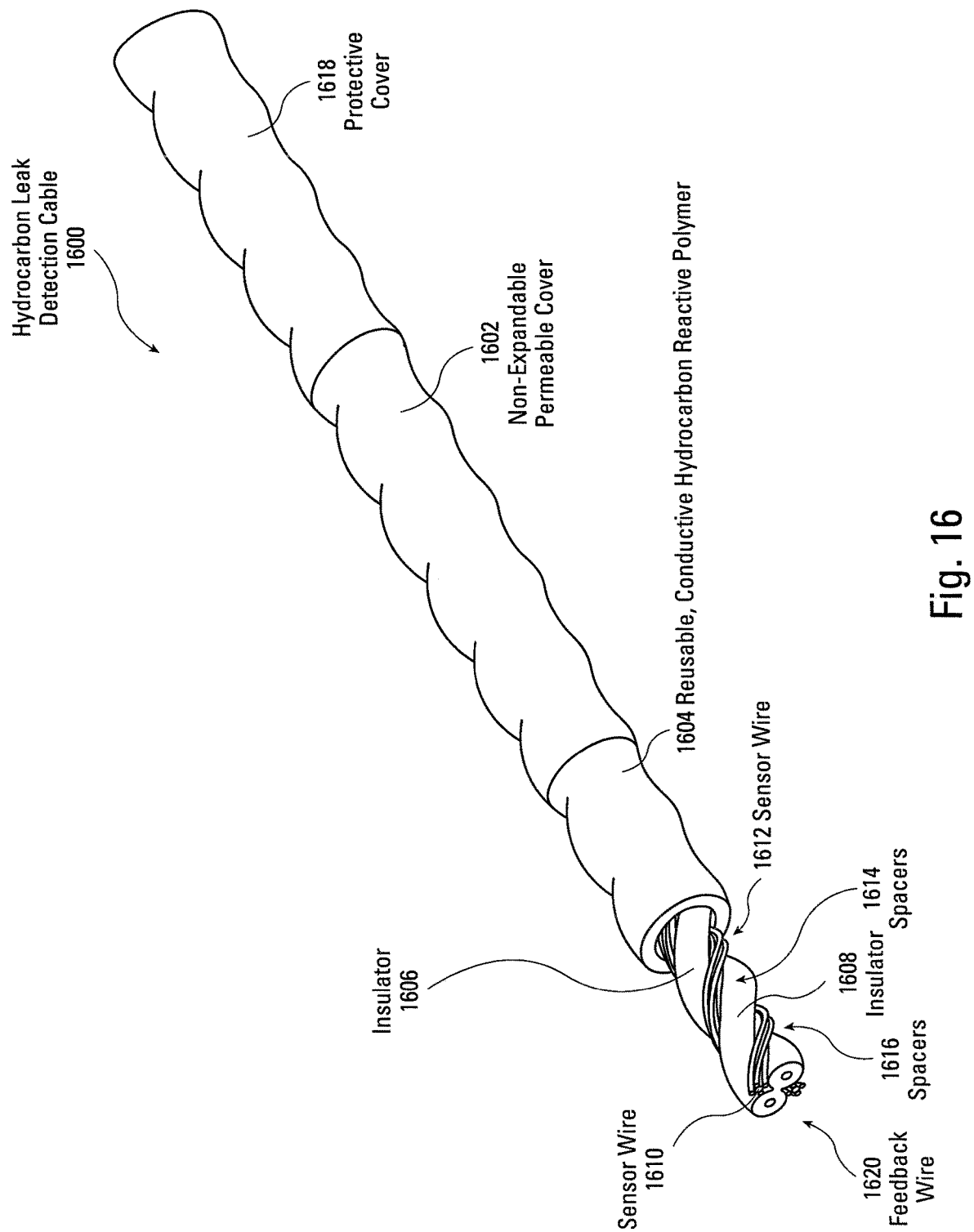
FIG. 16 is a partial cut-away view of another embodiment of a hydrocarbon leak detection cable.

FIG. 16 is an isometric cutaway version of another embodiment of the hydrocarbon leak detection cable 1600. The hydrocarbon leak detection cable 1600 has a protective cover 1618 that covers the non-expandable permeable cover 1602. Again, the protective cover 1618 provides protection against abrasions, punctures, and other wear of the non-expandable permeable cover 1602. Non-expandable permeable cover 1602 is made of the same materials as the other non-expandable permeable covers disclosed above, such as Santoprene. The non-expandable permeable cover 1602 is permeable to liquid and gas hydrocarbons so that the liquid and gas hydrocarbons pass through the non-expandable permeable cover 1602 and penetrate the reusable, conductive hydrocarbon reactive polymer 1604, which absorbs the hydrocarbons and swells. Since the non-expandable permeable cover 1602 allows little to no expansion, the reusable, conductive hydrocarbon reactive polymer 1604 swells in an inward direction towards sensor wire 1610 and sensor wire 1612, and moves between spacers 1614, 1616.

Figure 17:
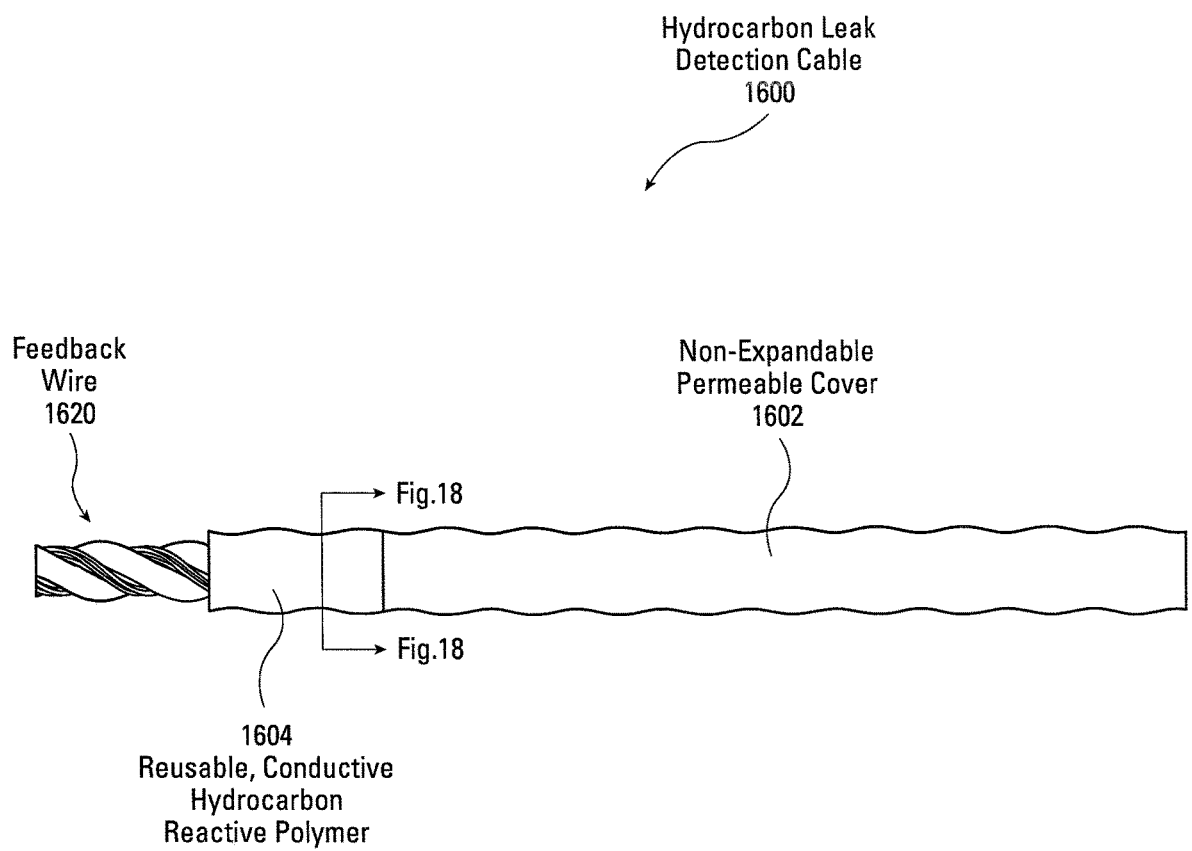
FIG. 17 is a side view of the hydrocarbon leak detection cable in FIG. 16.
Figure 18:
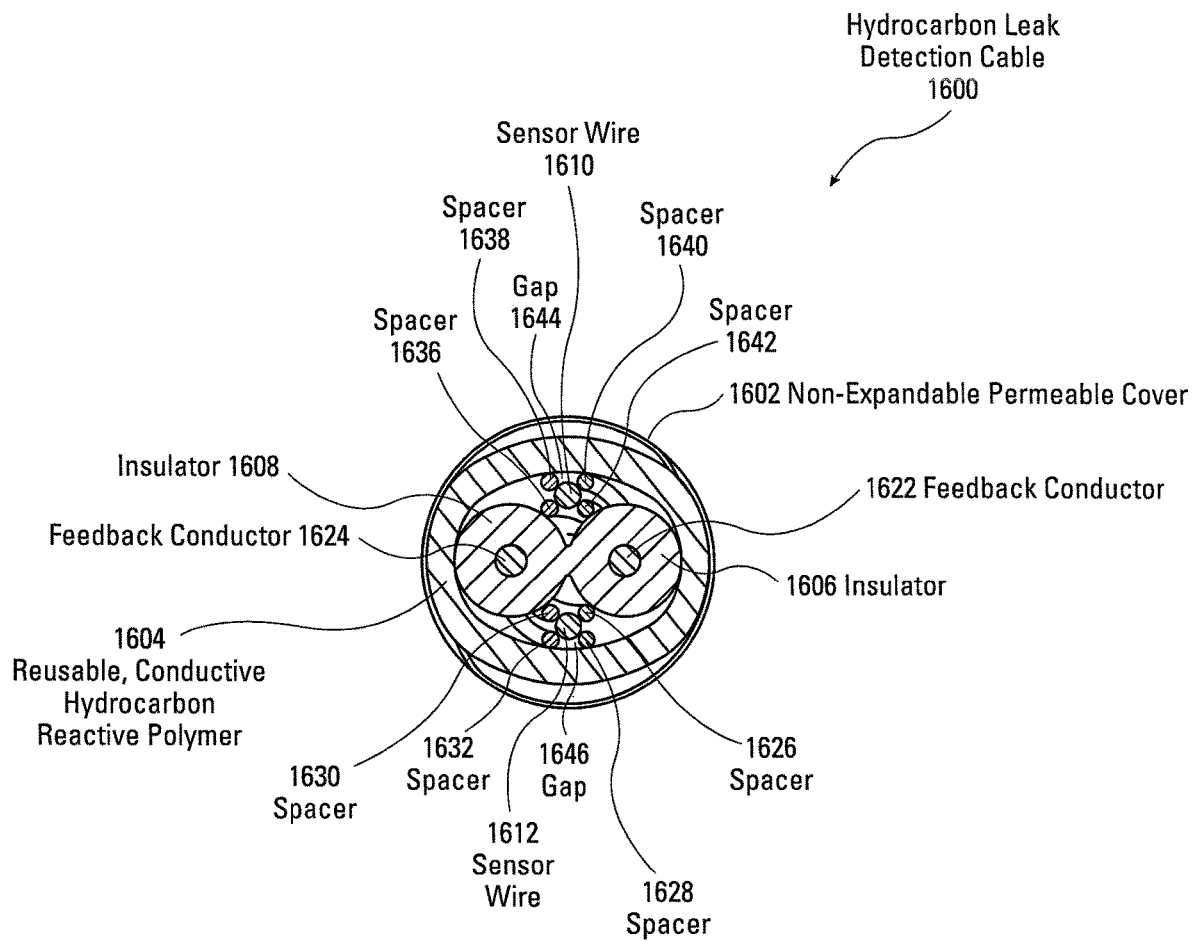
FIG. 18 is a cross-sectional view of the hydrocarbon leak detection cable illustrated in FIGS. 16 and 17, at the location indicated in FIG. 17.

FIG. 17 is a side cutaway view of the hydrocarbon leak detection cable 1600. As illustrated in FIG. 17, the non-expandable permeable cover 1602 covers the reusable, conductive hydrocarbon reactive polymer 1604, which in turn covers the feedback wire 1620. A cross-section of FIG. 17 is indicated in FIG. 17, which is illustrated in FIG. 18. The protective cover 1618 is not shown in FIGS. 17 and 18 for simplicity.

FIG. 18 is a cross-sectional view of the hydrocarbon leak detection cable 1600 at the location shown in FIG. 17. As illustrated in FIG. 18, the non-expandable permeable cover 1602 surrounds the reusable, conductive hydrocarbon reactive polymer 1604. The reusable, conductive hydrocarbon reactive polymer 1604 has an oval shape and is placed over the internal components of the hydrocarbon leak detection cable 1600. The reusable, conductive hydrocarbon reactive polymer 1604 can be placed over the internal portions of the hydrocarbon leak detection cable 1600 using various methods, including extrusion. The extruder can shape the reusable, conductive hydrocarbon reactive polymer 1604 so that it has the oval shape shown in FIG. 18. The feedback wire 1620 (FIG. 17) includes feedback conductor 1622, 1624 and insulators 1606, 1608. Sensor wire 1610 is surrounded by spacers 1636, 1638, 1640, 1642. Spacers 1636-1642 are braided around the sensor wire 1610 and then the braided sensor wire 1610 is placed in the recess between the insulators 1606, 1608. Similarly, sensor wire 1612 is surrounded by spacers 1626, 1628, 1630, and 1632, which are braided around the sensor wire 1612. The braided sensor wire 1612 is then placed in the other recess between insulators 1606, 1608. Other methods can be used for placing the spacers around the sensor wire such as by fusion or bonding.

In operation, when there is a hydrocarbon leak, liquid and gas hydrocarbons penetrate the protective cover 1618 and the non-expandable permeable cover 1602, and are absorbed by the reusable, conductive hydrocarbon reactive polymer 1604. The reusable, conductive hydrocarbon reactive polymer 1604 swells and expands as it absorbs the liquid and gas hydrocarbons. The non-expandable permeable cover 1602 does not allow the reusable, conductive hydrocarbon reactive polymer 1604 to expand outwardly so that the reusable, conductive hydrocarbon reactive polymer 1604 expands inwardly into gap 1644 and gap 1646. When a conductive connection between the reusable, conductive hydrocarbon reactive polymer 1604 is made between sensor wire 1610 and sensor wire 1612, a short circuit is created. The location of the short circuit and, consequently, the location of the hydrocarbon leak, is determined by detecting the change in flow of current and the amount of change in the flow of current, as described above.

Figure 19:
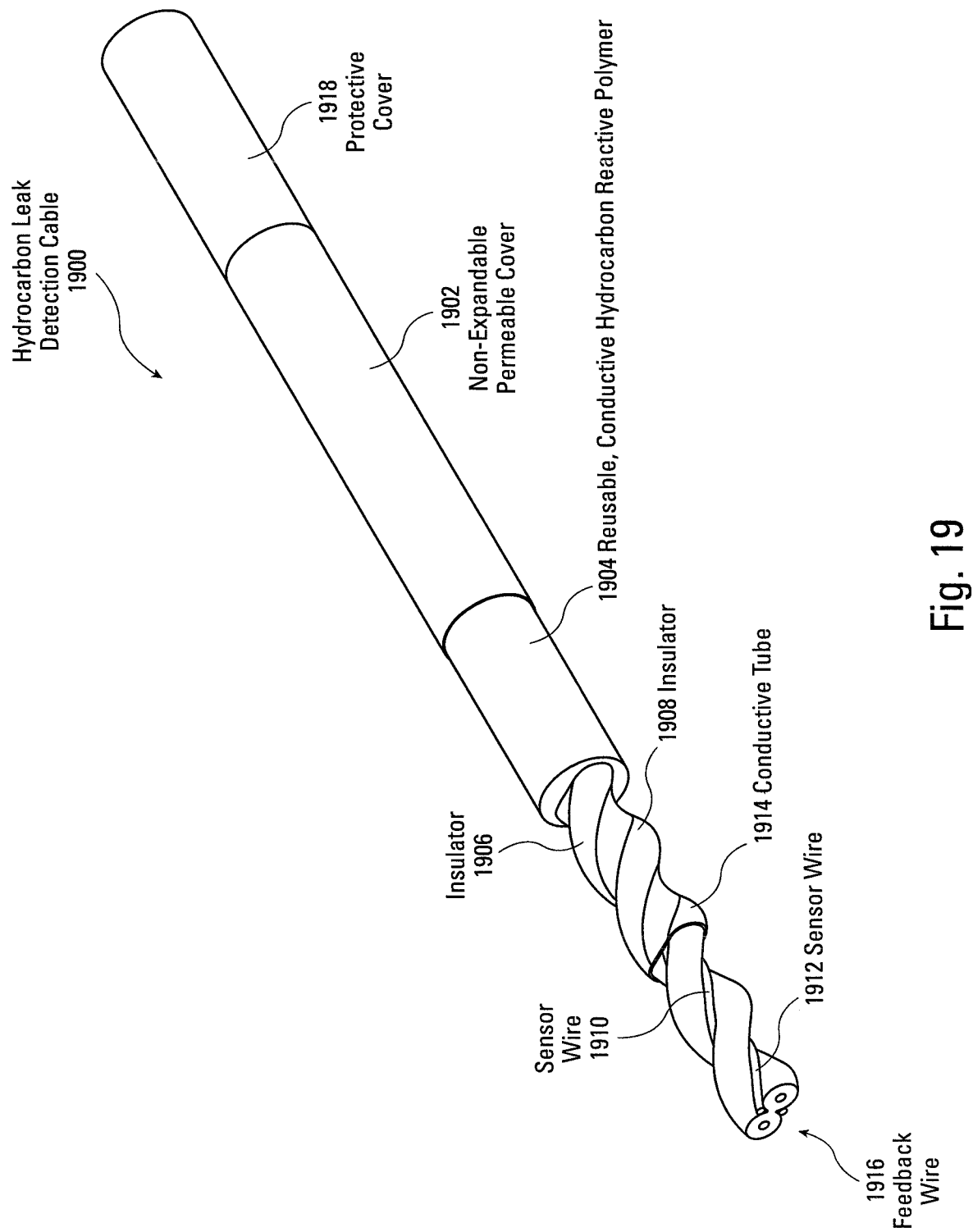
FIG. 19 is a partial cut-away view of another embodiment of a hydrocarbon leak detection cable.

FIG. 19 is an isometric cutaway view of another embodiment of a hydrocarbon leak detection cable 1900. As shown in FIG. 19, a protective cover 1918 covers a non-expandable permeable cover 1902. The protective cover 1918 and the non-expandable permeable cover 1902 are the same as the covers disclosed above. The non-expandable permeable cover 1902 covers the reusable, conductive hydrocarbon reactive polymer 1904. The reusable, conductive hydrocarbon reactive polymer 1904 covers the feedback wire 1916, which includes insulators 1906, 1908, conductive tube 1914, and sensor wires 1910, 1912.

Figure 21:
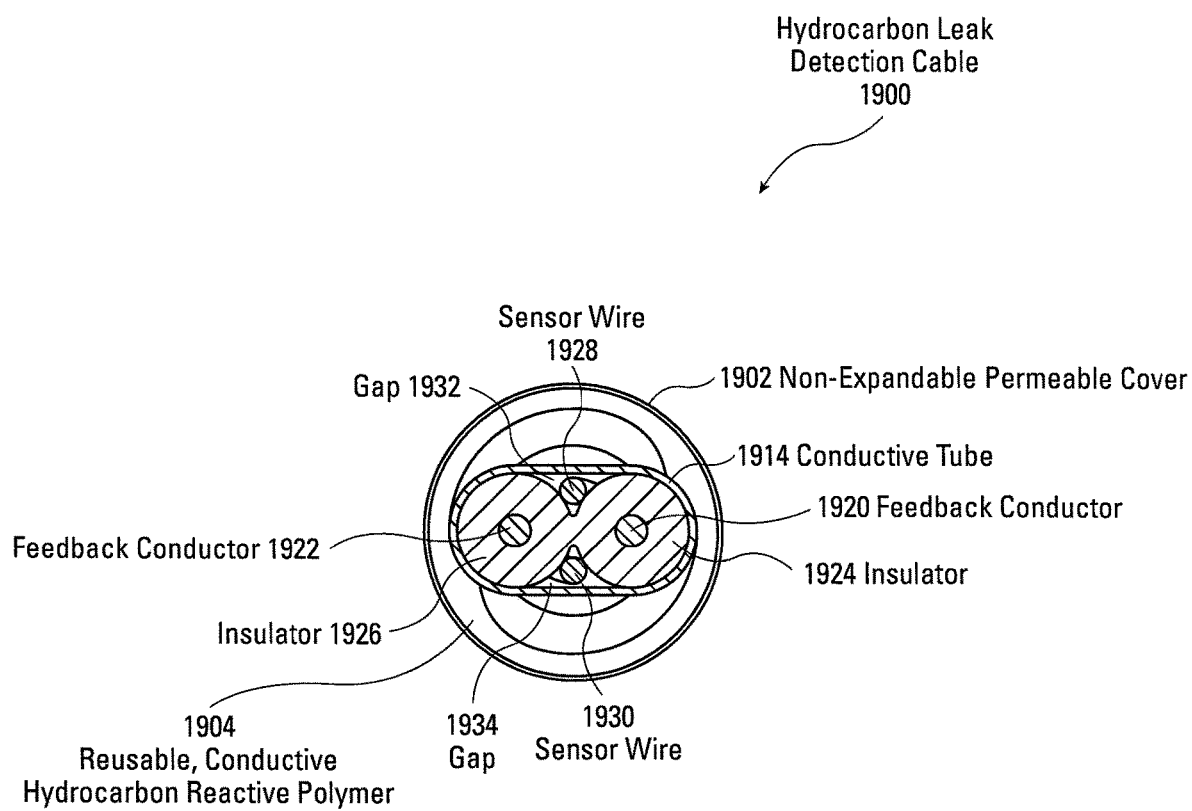
FIG. 21 is a cross-sectional view of the hydrocarbon leak detection cable illustrated in FIGS. 19 and 20, at the location indicated in FIG. 20.

Conductive tube 1914 is a tubular material that is extruded or placed in the hydrocarbon leak detection cable 1900 by other methods. The conductive tube 1914 is made from materials and has a thickness that provide a sufficient degree of stiffness so that the conductive tube 1914 does not accidentally touch sensor wires 1928, 1930, as illustrated in FIG. 21, unless there is pressure exerted on the conductive tube 1914 by the reusable, conductive hydrocarbon reactive polymer 1904. These materials may comprise nitrile, Santoprene, thermoplastic vulcanizate (TPV), polyurethane, thermoplastic polyurethane (TPU), ethylene vinyl acetate (EVA), etc., having a thickness which varies according to the percentage of swelling that occurs when absorbing hydrocarbons.

Figure 20:
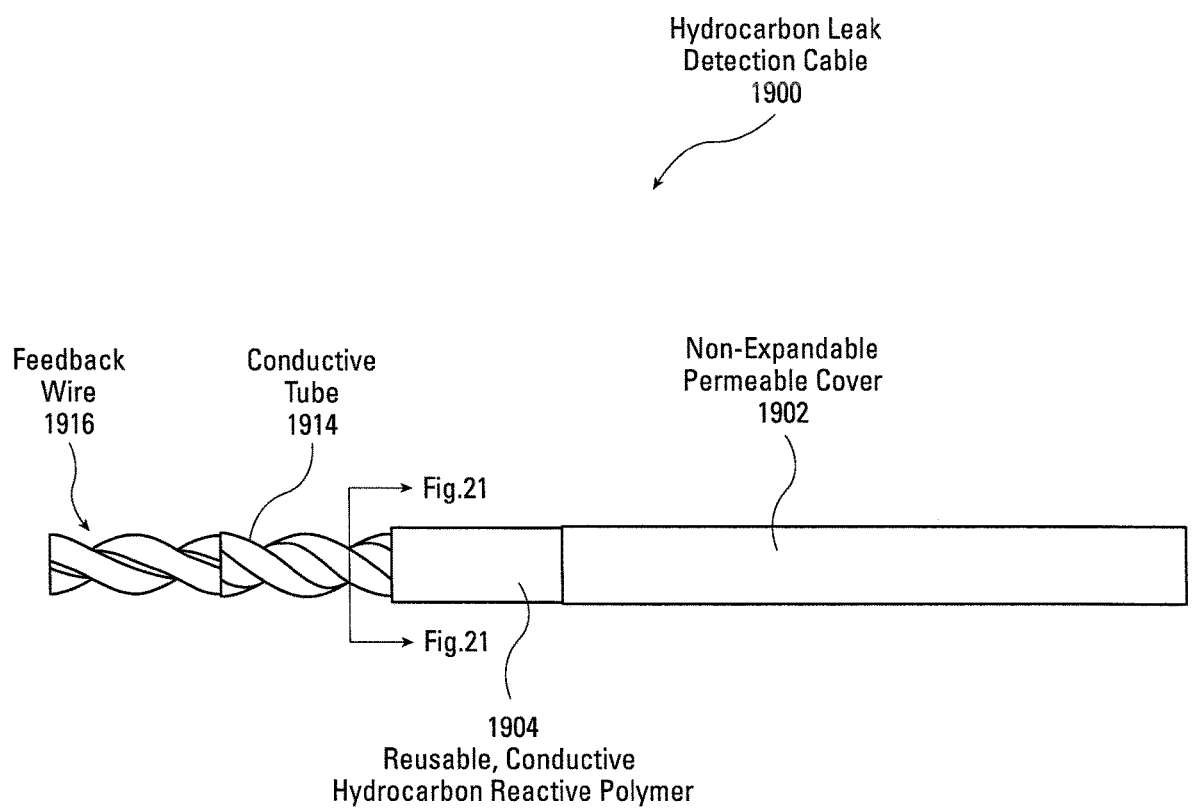
FIG. 20 is a side view of the hydrocarbon leak detection cable in FIG. 19.

FIG. 20 is a side cutaway view of the hydrocarbon leak detection cable 1900. As illustrated in FIG. 20, the non-expandable permeable cover 1902 covers the reusable, conductive hydrocarbon reactive polymer 1904. The reusable, conductive hydrocarbon reactive polymer 1904 covers the conductive tube 1914. FIG. 20 shows a cross-section which is illustrated FIG. 21.

FIG. 21 is a cross-sectional view of the hydrocarbon leak detection cable 1900. The location of the cross-section is illustrated in FIG. 20. As illustrated in FIG. 21, the non-expandable permeable cover 1902 covers the reusable, conductive hydrocarbon reactive polymer 1904. A conductive tube 1914 surrounds the insulators 1926, 1924 as well as sensor wires 1928, 1930. A gap 1932 is created between sensor wire 1928 and conductive tube 1914. Similarly, a gap 1934 is created between sensor wire 1930 and conductive tube 1914.

In operation, hydrocarbons penetrate the protective cover 1918 and the non-expandable permeable cover 1902, and are absorbed by the reusable, conductive hydrocarbon reactive polymer 1904. When the reusable, conductive hydrocarbon reactive polymer 1904 swells, it causes the conductive tube 1914 to move inwardly and contact sensor wires 1928, 1930, causing a short circuit. The location of the short circuit and the location of the hydrocarbon leak can be determined by changes in current from feedback conductors 1920, 1922, since the sensor wires 1928, 1930 are resistive wires.

Figure 22:
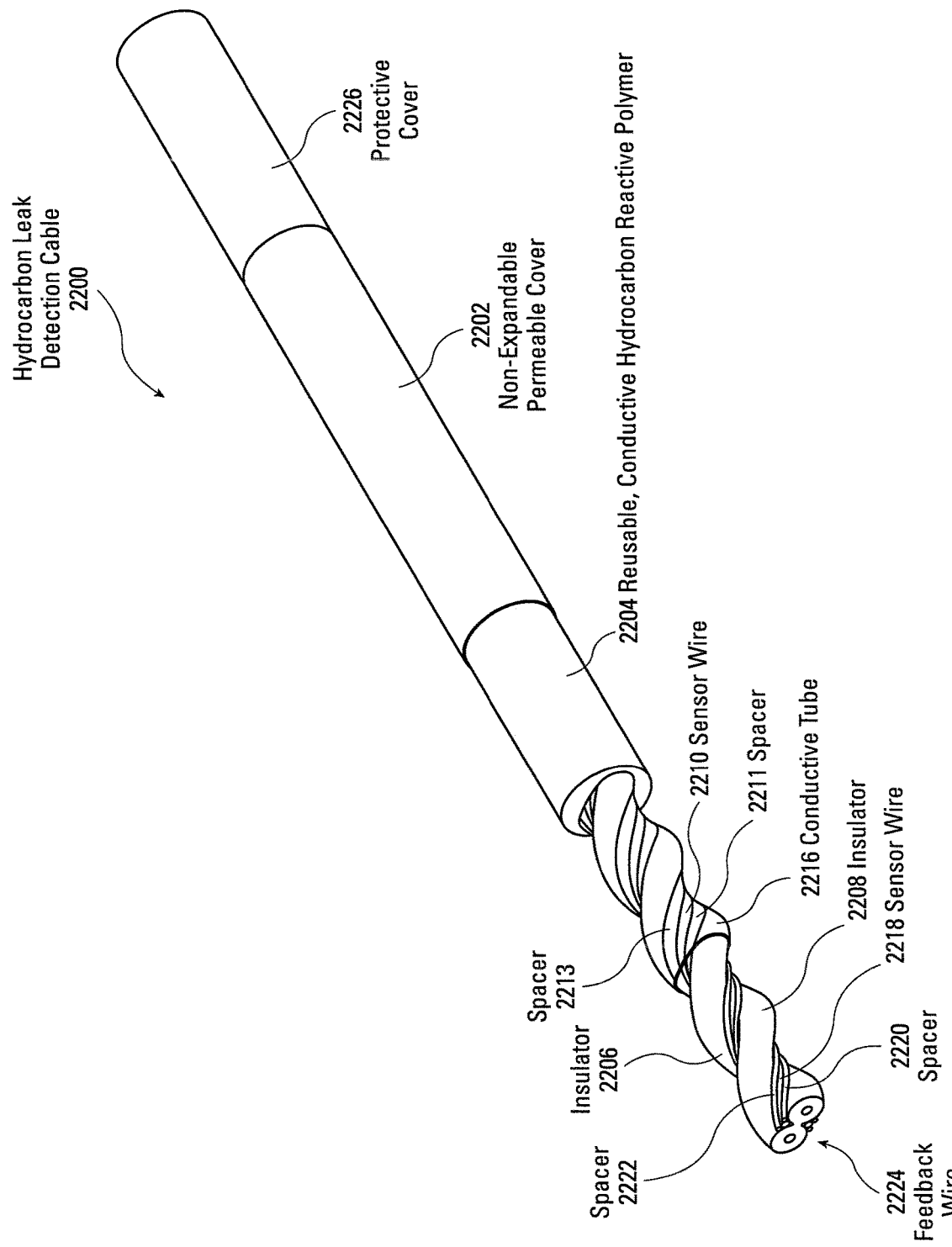
FIG. 22 is a partial cut-away view of another embodiment of a hydrocarbon leak detection cable.

FIG. 22 is an isometric cutaway view of another embodiment of a hydrocarbon leak detection cable 2200. As illustrated in FIG. 22, protective cover 2226 covers the non-expandable permeable cover 2202 and protects the non-expandable permeable cover 2202 from abrasions, punctures, and other wear. The non-expandable permeable cover 2202 surrounds the reusable, conductive hydrocarbon reactive polymer 2204. The reusable, conductive hydrocarbon reactive polymer 2204 expands in the presence of liquid and gas hydrocarbons and is hydrophobic so that it does not absorb or expand in the presence of moisture or water. Feedback wire 2224 includes insulators 2206, 2208. Spacers 2211, 2213, 2220, 2222, as well as sensor wires 2210, 2218 are placed in the recesses between the insulators 2206, 2208.

Figure 23:
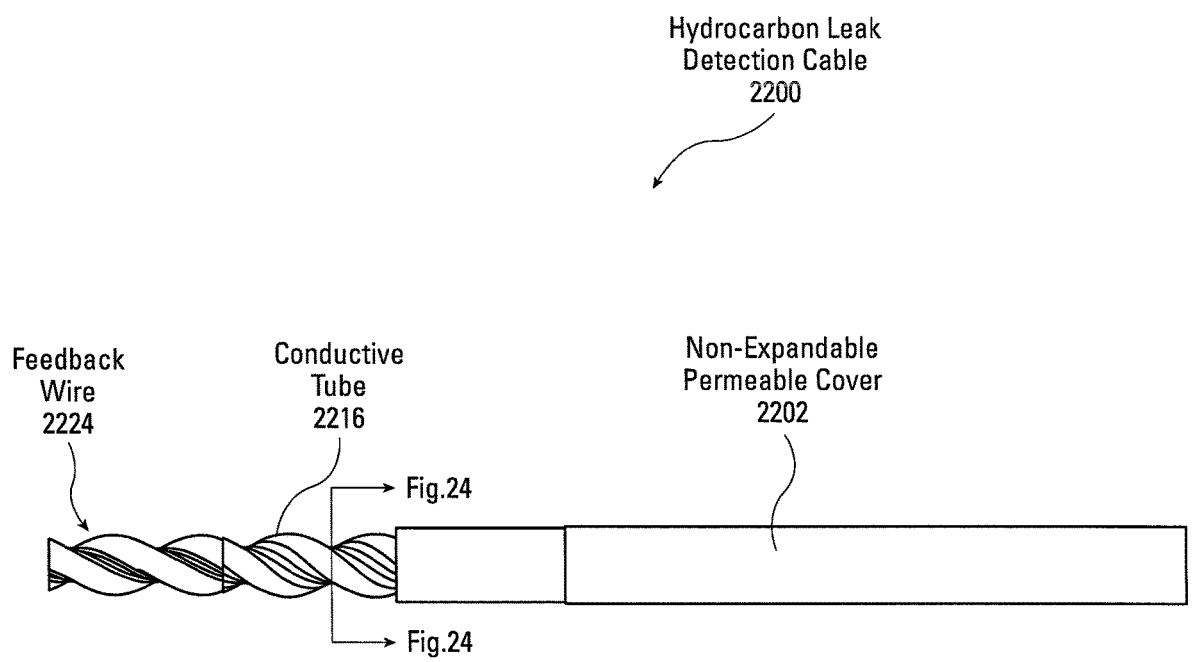
FIG. 23 is a side view of the hydrocarbon leak detection cable in FIG. 22.

FIG. 23 is a side cutaway view of the hydrocarbon leak detection cable 2200 illustrated in FIG. 22. FIG. 23 discloses the non-expandable permeable cover 2202, the conductive tube 2216, and the feedback wire 2224. FIG. 23 also discloses the location of the cross-section illustrated in FIG. 24.

Figure 24:
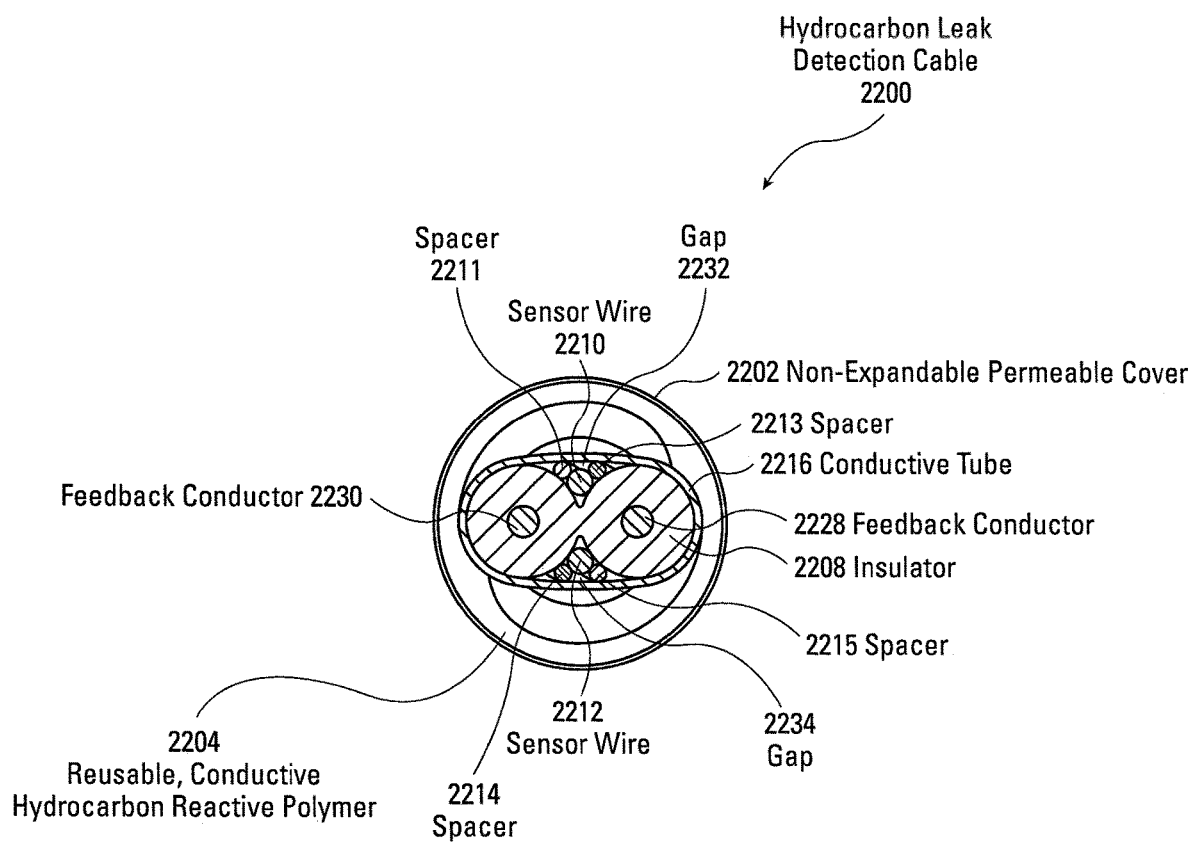
FIG. 24 is a cross-sectional view of the hydrocarbon leak detection cable illustrated in FIGS. 22 and 23, at the location indicated in FIG. 23.

FIG. 24 is a cross-sectional view of the hydrocarbon leak detection cable 2200 at the location shown in FIG. 23. As illustrated in FIG. 24, the non-expandable permeable cover 2202 covers the reusable, conductive hydrocarbon reactive polymer 2204. The protective cover 2226 is not illustrated in FIGS. 23 and 24. As shown in FIG. 24, the reusable, conductive hydrocarbon reactive polymer 2204 surrounds the conductive tube 2216. The conductive tube 2216 surrounds the insulators 2206, 2208, sensor wires 2210, 2212, and spacers 2211, 2213, 2214, and 2215. Spacers 2211, 2213 create a gap 2232 between the sensor wire 2210 and the conductive tube 2216. Similarly, spacers 2214, 2215 create a gap 2234 between the sensor wire 2212 and conductive tube 2216.

In operation, liquid and gas hydrocarbons penetrate the non-expandable permeable cover 2202 and are absorbed by the reusable, conductive hydrocarbon reactive polymer 2204. As the reusable, conductive hydrocarbon reactive polymer 2204 expands, it pushes the conductive tube 2216 into the gaps 2232, 2234 to create a conductive circuit (short circuit) between the sensor wire 2210 and sensor wire 2212. The location of the short circuit between the sensor wires provides the location of the hydrocarbon leak by detecting a change in current on feedback conductors 2228, 2230.

Figure 25:
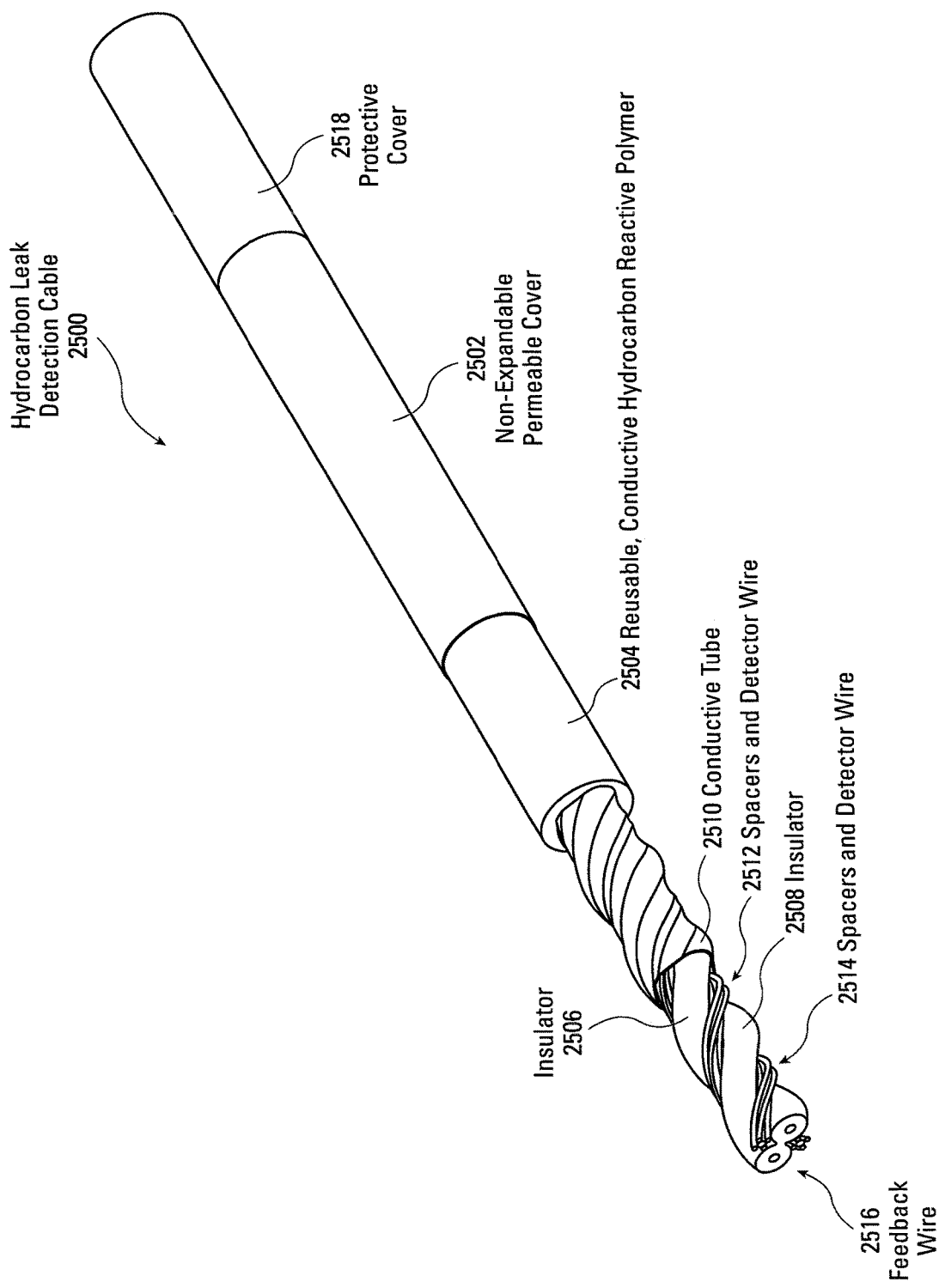
FIG. 25 is a partial cut-away view of another embodiment of a hydrocarbon leak detection cable.

FIG. 25 is an isometric cutaway depiction of another embodiment of a hydrocarbon leak detection cable 2500. As illustrated in FIG. 25, a protective cover 2518 provides protection for a non-expandable permeable cover 2502. Protective cover 2518 is permeable to hydrocarbons and protects the non-expandable permeable cover 2502 from abrasions, punctures, and other wear. The non-expandable permeable cover 2502 covers reusable, conductive hydrocarbon reactive polymer 2504. The reusable, conductive hydrocarbon reactive polymer 2504 absorbs hydrocarbons and expands as it absorbs the hydrocarbons. The reusable, conductive hydrocarbon reactive polymer 2504 surrounds a conductive tube 2510. The conductive tube 2510 surrounds the feedback wire 2516, which includes insulators 2506, 2508. Spacers and detector wires 2512, 2514 are placed in the recesses between the insulators 2506, 2508.

Figure 26:
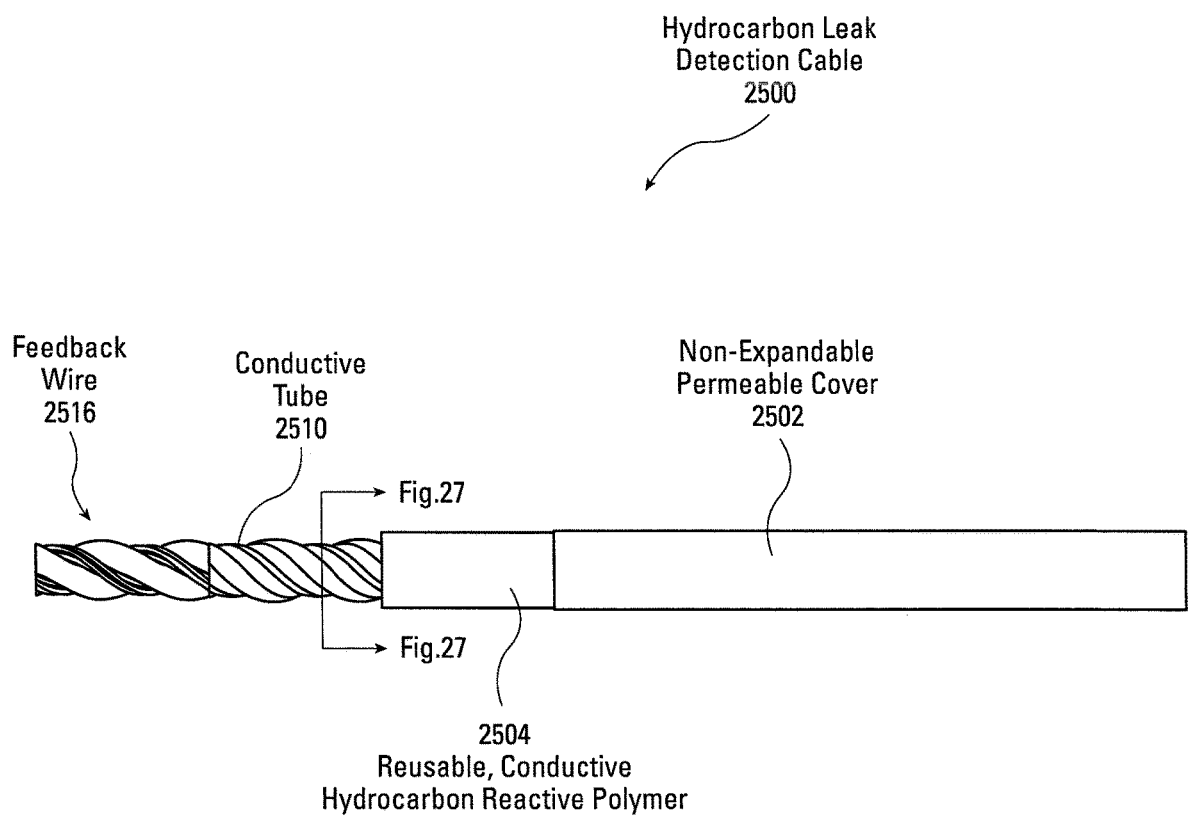
FIG. 26 is a side view of the hydrocarbon leak detection cable in FIG. 25.

FIG. 26 is a schematic side cutaway view of the hydrocarbon leak detection cable 2500. As shown in FIG. 26, the non-expandable permeable cover 2502 covers the reusable, conductive hydrocarbon reactive polymer 2504. The protective cover 2518 is not illustrated in either FIG. 26 or 27 for the purposes of simplicity. Feedback wire 2516 is surrounded by the conductive tube 2510. A cross-section is shown in FIG. 26 which is illustrated in FIG. 27.

Figure 27:
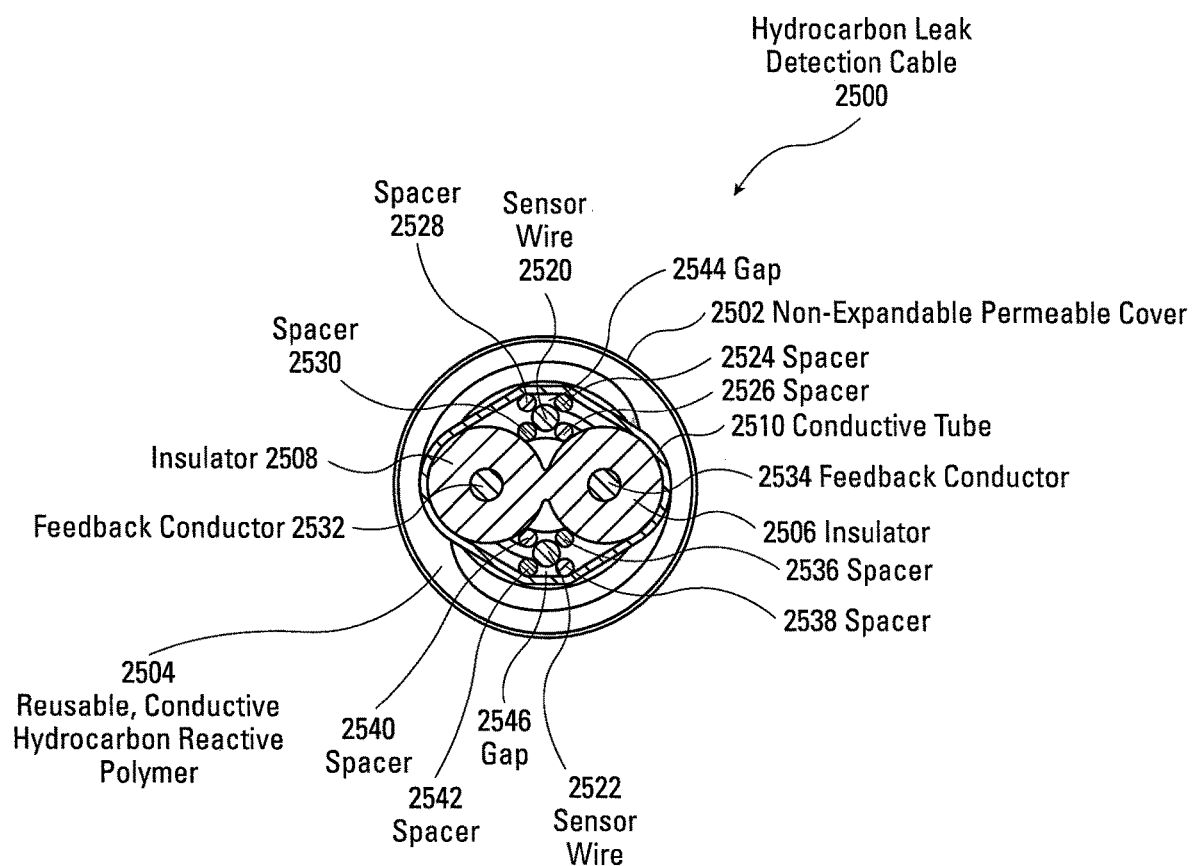
FIG. 27 is a cross-sectional view of the hydrocarbon leak detection cable illustrated in FIGS. 25 and 26, at the location indicated in FIG. 26.

FIG. 27 is a cross-section of the hydrocarbon leak detection cable 2500. As illustrated in FIG. 27, the non-expandable permeable cover 2502 surrounds the reusable, conductive hydrocarbon reactive polymer 2504. The reusable, conductive hydrocarbon reactive polymer 2504, just like the other reusable conductive hydrocarbon reactive polymers disclosed herein, can be cleaned by various solutions to remove the hydrocarbons and cause the reusable, conductive hydrocarbon reactive polymer 2504 to shrink to a size so that it can be reused. This eliminates the cost of replacement of the hydrocarbon leak detection cables disclosed herein. Sensor wire 2520 is surrounded by spacers 2524, 2526, 2528, and 2530 to securely locate the sensor wire 2520 in gap 2544 between the insulators 2506, 2508. The spacers 2524-2530 can be braided around the sensor wire 2520 and then placed in the recess between the insulators 2506, 2508.

The spacers 2524-2530 create a gap 2544 (recess) between the sensor wire 2520 and conductive tube 2510. Similarly, spacers 2536, 2538, 2540, 2542 surround sensor wire 2522 and are braided around the sensor wire 2522. The braided sensor wire 2522 is then placed in the recess between the insulators 2506, 2508. A gap 2546 is formed between the conductive tube 2510 and the sensor wire 2522.

In operation, liquid and gas hydrocarbons penetrate the non-expandable permeable cover 2502 and the protective cover 2518 illustrated in FIG. 25, and are absorbed by the reusable, conductive hydrocarbon reactive polymer 2504. The reusable, conductive hydrocarbon reactive polymer 2504 swells and expands inwardly so that the conductive tube 2510 is pushed inwardly, fills gap 2544, and contacts the sensor wire 2520. Similarly, the conductive tube 2510 is pushed inwardly and fills gap 2546, creating a short circuit between sensor wires 2520, 2522 at the location of the hydrocarbon leak. The location of the hydrocarbon leak is then determined by sensing a change in current on feedback conductors 2532, 2534, in the same manner as disclosed above.

Figure 28:
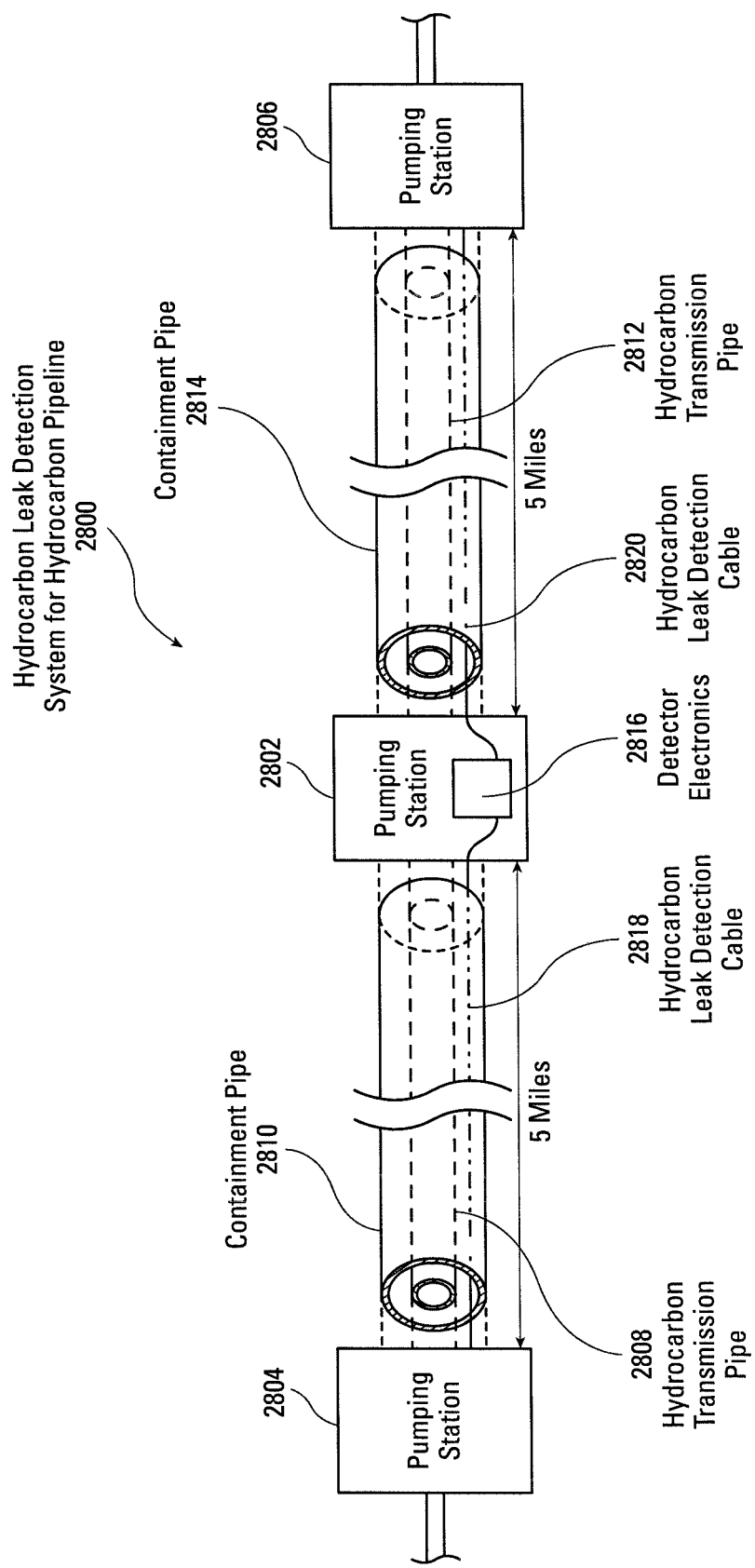
FIG. 28 is a schematic depiction of the use of the hydrocarbon leak detection system for detecting hydrocarbon leaks in a pipeline.

FIG. 28 is a schematic diagram of a hydrocarbon leak detection system for hydrocarbon pipeline 2800. As illustrated in FIG. 28, pumping stations 2802, 2804, 2806 are separated by about five miles. Hydrocarbons are pumped through the hydrocarbon transmission pipes 2808, 2812. The containment pipe 2810 surrounds the hydrocarbon transmission pipe 2808. Similarly, a containment pipe 2814 surrounds the hydrocarbon transmission pipe 2812. The purpose of the containment pipes 2810, 2814 is to contain any leaks that occur in the hydrocarbon transmission pipes 2808, 2812. Placed within the containment pipe 2810 is a hydrocarbon leak detection cable 2818. Normally, the hydrocarbon leak detection cable 2818 would be placed at the bottom of the containment pipe 2810 to contact any liquid hydrocarbons that leak from the hydrocarbon transmission pipe 2808 into the containment pipe 2810. Similarly, hydrocarbon leak detection cable 2820 is placed within containment pipe 2814 at the bottom of the containment pipe 2814. Again, such placement is made for the purpose of contacting any liquid hydrocarbons that leak from the hydrocarbon transmission pipe 2812 and gather at the bottom of the containment pipe 2814. Pumping station 2802 includes detector electronics 2816 that are connected to hydrocarbon leak detection cables 2818, 2820. As such, detector electronics 2816 can be used to detect leaks for at least five miles going in each direction from the pumping station 2802.

Figure 29:
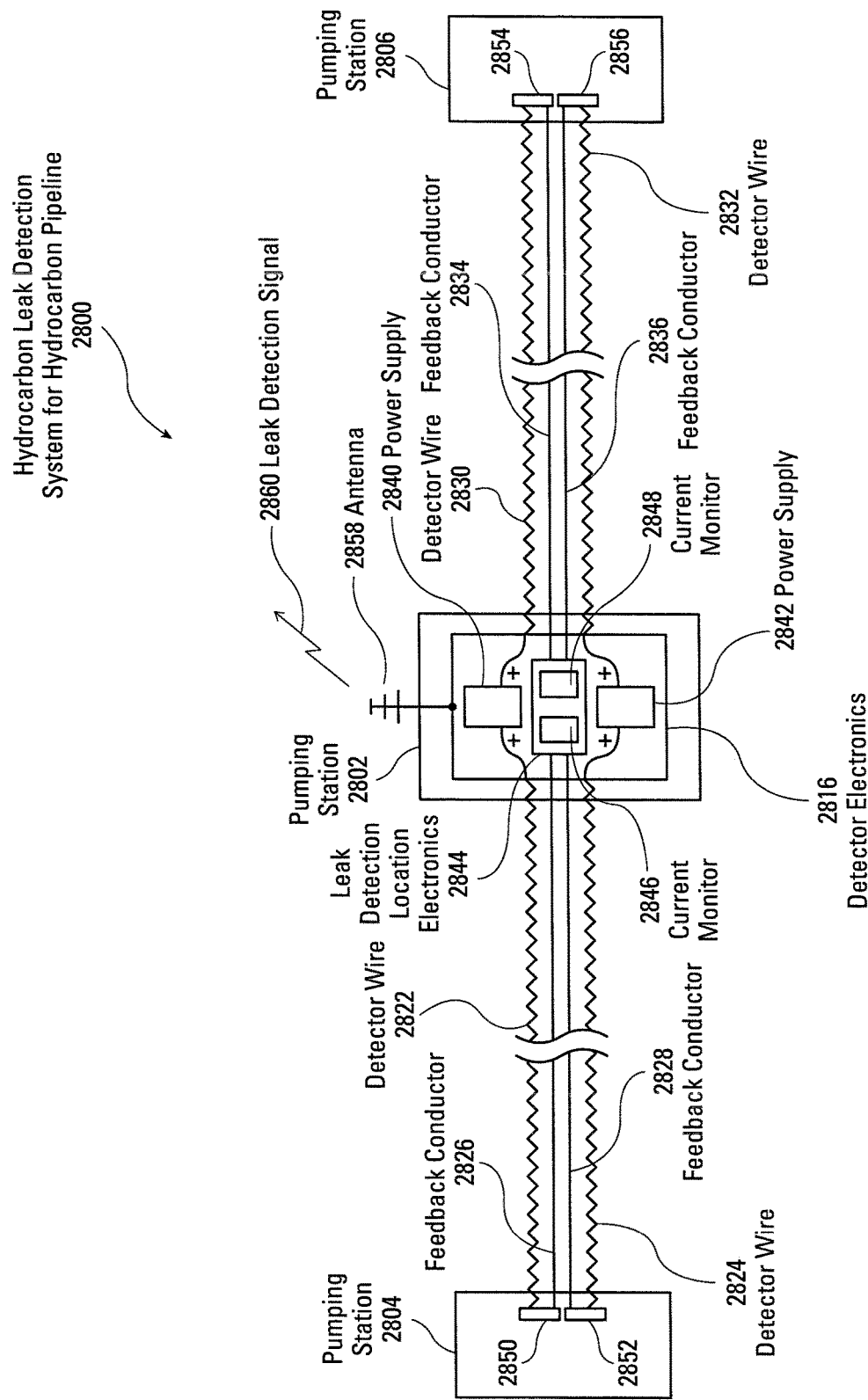
FIG. 29 is a more detailed schematic view of the hydrocarbon leak detection system for detecting in hydrocarbon pipelines.

FIG. 29 is an additional schematic view of the hydrocarbon leak detection system for hydrocarbon pipeline 2800. As illustrated in FIG. 29, pumping station 2802 is located a distance, such as five miles, from pumping stations 2804, 2806. Feedback conductors 2826, 2828 are a portion of the feedback wire utilized in the various embodiments of the present invention. Detector wires 2822, 2824 are resistive wires that have a uniform resistance per unit length so that the location of a hydrocarbon leak can be detected as a result of the detector wires 2822, 2824 being conductively connected, as explained above. Detector wire 2822 is conductively connected to the feedback conductor 2826 by the connector 2850 located in pumping station 2804. Similarly, detector wire 2824 is conductively connected to feedback conductor 2828 by the connector 2852 located in pumping station 2804. Detector wire 2830 is conductively connected to feedback conductor 2834 by connector 2854 located in pumping station 2806. Detector wire 2832 is conductively connected to feedback conductor 2836 in pumping station 2806 by connector 2856. A short between detector wires 2822, 2824, 2830, 2832, illustrated in FIG. 29, will create a change in current in feedback conductors 2826, 2828, 2834, 2836, which is detected by current monitors 2846, 2848. Power supply 2840 and power supply 2842 monitor any changes in current in feedback conductors 2826, 2828, 2834, 2836. Leak detection location electronics 2844 determines the location of the leak based upon the change in current monitored by current monitors 2846, 2848. Antenna 2858 generates a leak detection signal 2860 that is transmitted to a central detection station for alerting users of the leak.

Accordingly, the hydrocarbon leak detection cables of the present invention provide a conductive method of determining the location of hydrocarbon leaks. A reusable conductive hydrocarbon reactive polymer is employed which can be cleaned using various solvents so that the hydrocarbon leak detection cable does not need to be replaced. Alternatively, a hydrocarbon reactive polymer that is not reusable, and requires replacement, can also be used. Changes in the amount of current provided through the feedback conductors allows for accurate detection of the location of the hydrocarbon leak. The sensor wires are made from a resistive material which has a uniform resistance per unit length, that allows for the accurate detection of the location of the hydrocarbon leak. The conductive method of detecting leaks is reliable and inexpensive and can be accurately used over long distances, in a manner that cannot be achieved using other methods. The various embodiments utilize a standard feedback wire that is used in many other applications, such as leak detectors for detecting moisture and water leaks. The hydrocarbon leak detection cable embodiments can be used between pumping stations on oil or gas pipelines that are spaced five miles apart or more. One set of electronics can be used at every other pumping station to detect leaks in a five mile direction going each way from the pumping station. The present disclosure indicates that the location of the leak can be detected by detecting changes in current over the sensor wires. Other techniques can be used, including a detection in change of resistance, voltage drops, or other techniques that are known in the art. These techniques are well known by those skilled in the art. These electronics can be connected wirelessly, or via a wire connection, to a central monitoring station that can provide immediate information as to the location of any leaks along an oil or gas pipeline. The same techniques can be used for hydrocarbon storage containers. In that regard, although the present disclosure refers to liquid and gas hydrocarbons, the reusable conductive hydrocarbon reactive polymers disclosed herein can also be used with regard to various gases and operate in the same fashion.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A hydrocarbon leak detection cable comprising:
   a feedback wire having at least two feedback conductors and at least two insulators surrounding said feedback conductors, said insulators being disposed in an adjacent configuration to form recesses between said insulators;

sensor wires disposed in said recesses between said insulators so that said sensor wires are separated by said insulators, said sensor wires having a uniform resistance per unit of length;

a conductive fabric covering that surrounds said feedback wire and said sensor wires that is placed over said feedback wire and said sensor wire so that a gap is formed between said conductive fabric covering and said sensor wires;

a reusable hydrocarbon reactive polymer that surrounds said conductive fabric covering and expands upon absorption of hydrocarbons from an original size to an expanded size, and shrinks to said original size when said hydrocarbons are cleaned from said reusable hydrocarbon reactive polymer;

a non-expandable permeable cover surrounding said reusable hydrocarbon reactive polymer that is permeable to hydrocarbons and directs forces from expansion of said reusable hydrocarbon reactive polymer, as a result of absorption of said hydrocarbons, in an inward direction which causes said conductive fabric covering to move inwardly towards said sensor wires into said gap between s lid conductive fabric covering and said sensor wires so that said conductive fabric braid contacts said sensor wires to create electrical conduction between said sensor wires where said hydrocarbon reactive polymer expands.

2. The hydrocarbon leak detection cable of claim 1 wherein:
said reusable hydrocarbon reactive polymer comprises Santoprene.

3. The hydrocarbon leak detection cable of claim 1 wherein:
said conductive fabric covering comprises a conductive tube.

* * * * *